US012609629B2

(12) United States Patent
Weis et al.

(10) Patent No.: US 12,609,629 B2
(45) Date of Patent: Apr. 21, 2026

(54) SINGLE-PHASE MODULE OF AN INVERTER, INVERTER AND POWER ELECTRONICS

(71) Applicant: ZF Friedrichshafen AG, Friedrichshafen (DE)

(72) Inventors: Cornelius Weis, Baiersdorf (DE); Christoph Schikora, Regensburg (DE); Hermann Thurn, Eckersdorf (DE); Herbert Wallner, Auerbach (DE); Thomas Wittig, Gesees (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 261 days.

(21) Appl. No.: 18/342,616

(22) Filed: Jun. 27, 2023

(65) Prior Publication Data

US 2024/0007015 A1      Jan. 4, 2024

(30) Foreign Application Priority Data

Jun. 29, 2022      (DE) .......................... 102022206596.4

(51) Int. Cl.
| *H02M 7/00* | (2006.01) |
| *B60K 1/00* | (2006.01) |
(Continued)

(52) U.S. Cl.
CPC .............. *H02M 7/003* (2013.01); *B60K 1/00* (2013.01); *B60L 50/60* (2019.02); *H02P 27/06* (2013.01); *B60L 2210/40* (2013.01)

(58) Field of Classification Search
CPC ...... H02M 7/537; H02M 7/003; H02M 1/088; H05K 7/14329; H05K 7/20909;
(Continued)

(56) References Cited

U.S. PATENT DOCUMENTS

| 10,917,992 B2 * | 2/2021 | Feurtado .............. H05K 1/0271 |
| 2020/0053900 A1 | 2/2020 | Feurtado et al. |

FOREIGN PATENT DOCUMENTS

| FR | 3076063 A1 * | 6/2019 | ......... B60R 16/0239 |
| WO | WO-2013182694 A1 * | 12/2013 | ............ B60W 10/10 |

OTHER PUBLICATIONS

Office Action issued in corresponding German Patent Application No. DE 10 2022 206 596.4, dated Feb. 16, 2023 (10 pages).

* cited by examiner

*Primary Examiner* — Imani N Hayman
*Assistant Examiner* — Ross Terry Mularski
(74) *Attorney, Agent, or Firm* — Crowell & Moring LLP

(57)      ABSTRACT

A single-phase module of an inverter of an electric drive system of an at least partially electrically powered vehicle is disclosed, comprising a baseplate, at least two semiconductor packages comprising half-bridges which are arranged on the baseplate and are directly fastened thereto, conductor rails configured in a stacked arrangement on the half-bridges and electrically contact-connected with associated power terminals, comprising a DC-positive conductor rail, a DC-negative conductor rail and an AC conductor rail, wherein the conductor rails, at least in regions at which they are to be electrically insulated from other components, are enclosed in an electrically non-conductive cladding, and wherein components are configured such that each of the latter, in regions at which, upon assembly, they are to be positioned in relation to other components, comprise at least one positioning geometry for positioning, which engages with a corresponding mating structure provided in the other components.

11 Claims, 16 Drawing Sheets

(51) Int. Cl.
    *B60L 50/60*         (2019.01)
    *H02P 27/06*         (2006.01)

(58) Field of Classification Search
    CPC .. H05K 7/209; H05K 7/20509; H05K 5/0069;
                H05K 1/181; H05K 1/0271; H05K
                5/0247; B60L 2210/40; B60L 50/60;
                    B60K 1/00; H02P 27/06
    USPC ......................................................... 361/807
    See application file for complete search history.

10

107   102  103  108   102   104   107

103                                    104

10

9,
GND

GND              GND

92

SINGLE-PHASE MODULE OF AN INVERTER, INVERTER AND POWER ELECTRONICS

CROSS-REFERENCE TO RELATED APPLICATION

This application claims priority to German Application No. DE 10 2022 206 596.4, filed on Jun. 29, 2022, the entirety of which is hereby fully incorporated by reference herein.

FIELD

The present invention relates to the field of electromobility, particularly to electronics modules for an electric drive system.

BACKGROUND AND SUMMARY

The employment of electronics modules, for example power electronics modules, in motor vehicles has increased substantially in recent decades. This is attributable, firstly to the necessity for fuel economy and the improvement of vehicle performance, and secondly to advances in semiconductor technology. The main components of an electronics module of this type, also described as power electronics, are an electronic control unit, also described as an ECU, which is connected to the vehicle control device(s) or is an element thereof and/or which receives information based e.g. upon driving behavior, or signals from other control devices, and a DC/AC converter (inverter) which is employed for the energization of electrical machines, such as electric motors or generators, with a multi-phase alternating current (AC). A direct current, which is generated by means of a DC energy source, for example a battery or an accumulator, is thus converted into a multi-phase alternating current. To this end, the inverter comprises a plurality of electronic components, which are employed for the embodiment of bridge circuits (for example half-bridges), for example power semiconductor switches, also described as power semiconductor. Additionally, power electronics can also include a DC/DC converter.

Known electronics modules are modular, in that bridge circuits can be expanded in the interests of increasing capacity, or in that bridge circuits can be omitted, as a result of which, however, electrical properties are partially impaired. For example, a commutation cell will only be ideal for a specific topology. If bridge circuits are added or removed, the commutation cell will no longer be ideal.

An object of the invention is therefore the provision of an improved electronics module.

This object is fulfilled by the features as disclosed herein. Advantageous configurations are also disclosed herein. Further features and advantages of the invention proceed from the following description of exemplary embodiments of the invention, with reference to the figures included in the drawings, which represent details of the invention, and from the claims. Individual features can be embodied in isolation in each case or, in a variant of the invention, a plurality thereof can be embodied in an arbitrary combination.

Preferred embodiments of the invention are described in greater detail hereinafter, with reference to the attached drawings.

DETAILED DESCRIPTION

Figure 1:
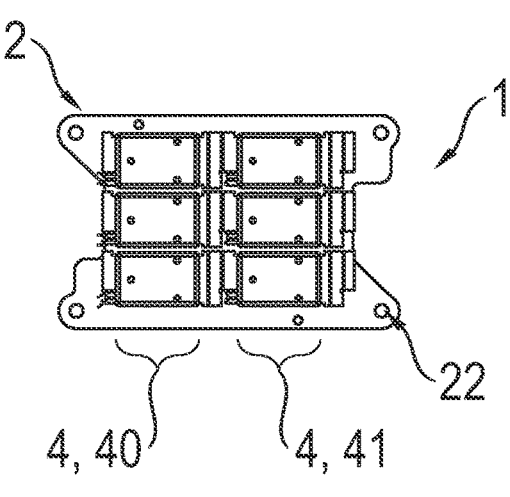
FIGS. 1 and 2 show a basic structure of a single-phase module, having a baseplate and semiconductor packages arranged thereupon, according to one embodiment of the present invention.

In the following descriptions of the figures, identical elements or functions are identified by the same reference symbols.

As mentioned above, one object of the present disclosure is the provision of an improved electronics module. A particular objective is that the latter should assume an improved modularity and an optimized topology for the commutation cell.

Currently known electronics modules which are employed in the field of electromobility are configured in the form of three-phase modules. This means that they comprise a single and common baseplate 2 for all three phases P1-P3, on which the semiconductor packages 4 are arranged.

The baseplate 2 assumes the function of a carrier, and is formed of a sufficiently stable material having good thermal conductivity such as e.g. copper, such that adequate heat evacuation and attachment of the semiconductor packages 4 are provided. Accordingly, it is not configured as a circuit board, and comprises no current- or signal-conducting conductors. It can be formed of an electrically conductive material, and thus additionally provides a ground potential GND. However, it can also be comprised of an electrically non-conductive material, wherein the ground potential GND can then be additionally provided by means of a screw.

Semiconductor packages 4 are generally arranged in mutual opposition such that, in each case, two of the latter form a half-bridge, wherein one semiconductor package 4 functions as a high-side switch 41 and the other functions as a low-side switch 40, each of which comprises two mutually parallel-connected power semiconductors, e.g. MOSFETs, IGBTs, etc. One or more half-bridges can be provided for each phase P1-P3. Above the half-bridges, DC and AC conductor rails are arranged, and are electrically contact-connected with associated power terminals of the half-bridges. At present, the commutation cell is only optimal for a specific topology, i.e. a given number of half-bridges and a given arrangement of conductor rails. If, for example, more or fewer half-bridges are required in order to achieve the desired power setting, these are added or omitted, wherein there is no corresponding adjustment of topology, and optimization of the commutation cell is thus deficient. Moreover, in the region of the baseplate 2, the electronic control unit, or ECU for short, i.e. a driver, is installed, and is connected to all components with a signal transmission capability. In general, sufficient space is missing for the addition of further components and the connection thereof with a signal transmission capability.

In the light of the need for the improvement of known electronics modules, particularly with respect to modularity and the optimization of the commutation cell, it is proposed that a single-phase module 1 be provided, in which all the necessary components for the operation of a single phase P1-P3 are present, and the topology (geometrical and electrical arrangement) thereof, in each case, is tailored to only a specific design, i.e. to specific semiconductor packages 4 and arrangements of conductor rails 5-7 which are optimized with respect thereto. If the type or number of semiconductor packages 4 are varied, the geometry of the baseplate 2 and the arrangement of conductor rails 5-7 can be adapted to the semiconductor packages 4 employed, in order to optimize the commutation cell. The term semiconductor package 4 describes a sheathed power semiconductor (chip), inclusive of (unsheathed) terminal lugs for electrical or signal contact-connection.

In the proposed single-phase module 1, a baseplate 2 is provided, together with at least two semiconductor packages 4 arranged in mutual opposition, which form a half-bridge. In each case, one of the semiconductor packages 4 is configured as a high-side switch 40, and the other as a low-side switch 41. In the embodiment represented in FIG. 1, three half-bridges, i.e. 2×3 semiconductor packages 4 are provided. In the embodiment represented in FIG. 2, four half-bridges, i.e. 2×4 semiconductor packages 4 are provided. The semiconductor packages 4 are fastened directly to the baseplate 2, e.g. by sintering to the latter. In all the embodiments described hereinafter, the semiconductor packages 4 are arranged in mutual opposition with a central AC tap (c.f. the AC power terminal 70 e.g. in FIG. 7). Moreover, the DC-negative conductor rail 6 is configured in a full-surface contact arrangement over all the half-bridges, between the DC-positive conductor rail 5 (arranged on the side of the baseplate 2) and the AC conductor rail 7, and the DC-negative and DC-positive taps 53, 66 project from the same side of the single-phase module 1, whereas the AC tap 71 projects from the other side of the single-phase module 1. Although the sequence described corresponds to a preferred embodiment, a different configuration can also be employed, without deviating from the core of the invention.

Figure 2:
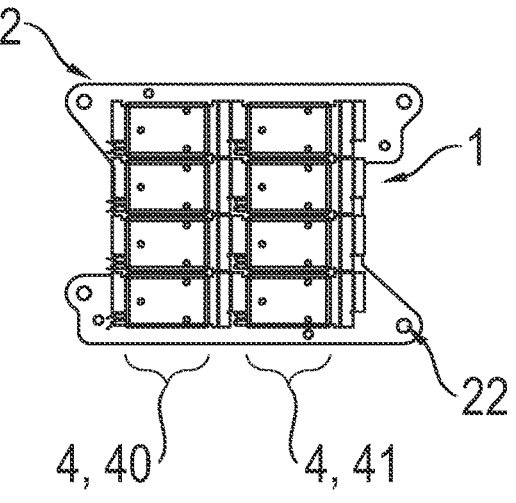

As can be seen from FIGS. 1 and 2, the geometry (length and width) of baseplates 2 of the single-phase modules 1, by way of distinction from the prior art, can be adapted to the number of semiconductor packages 4. In all cases, this geometry is thus optimally restricted, i.e. is no greater than required for the accommodation of semiconductor packages 4. The single-phase module 1 is thus scalable, wherein the size of the baseplate 2 is adapted to the number of semiconductor packages 4. Particularly advantageously, three, four or six half-bridges, i.e. six, eight or twelve semiconductor packages 4 are provided.

Moreover, on the semiconductor packages 4, conductor rails 5-7 (DC-positive conductor rails 5, DC-negative conductor rails 6, AC conductor rails 7) are configured in a stacked arrangement, thus forming a conductor rail stack. Conductor rails are electrically connected to associated power terminals of the semiconductor packages 4, wherein the AC tap is arranged centrally between two mutually opposing semiconductor packages 4. By the arrangement and geometry of the conductor rails 5-7, the commutation cell can be optimized.

In a first embodiment, the plate stack or conductor rail stack formed by the conductor rails 5-7 is already optimized, merely by the small geometrical dimensions of the baseplate 2 and the short current paths associated therewith.

Figure 3:
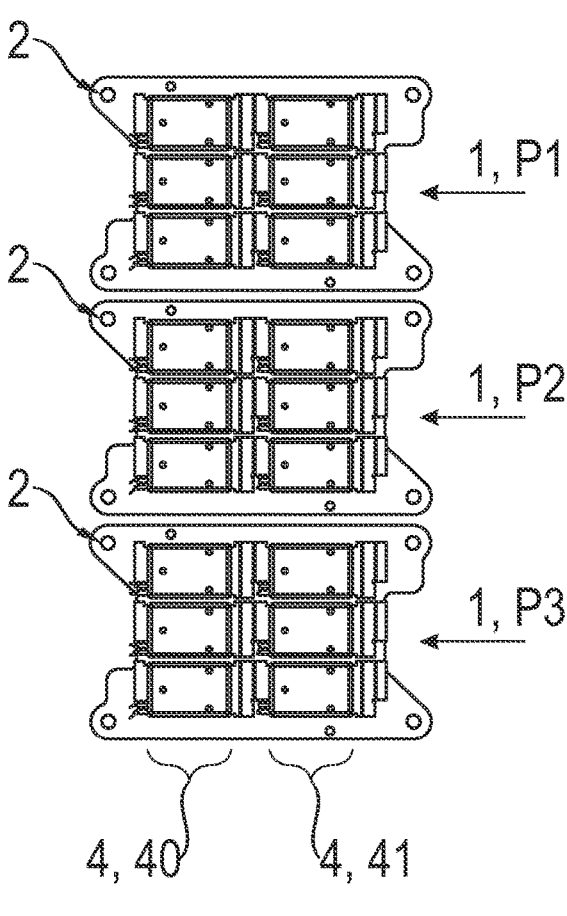
FIGS. 3 and 4 show three single-phase modules according to FIGS. 1 and 2, illustrated for the representation of an inverter according to one embodiment of the present invention.
Figure 4:
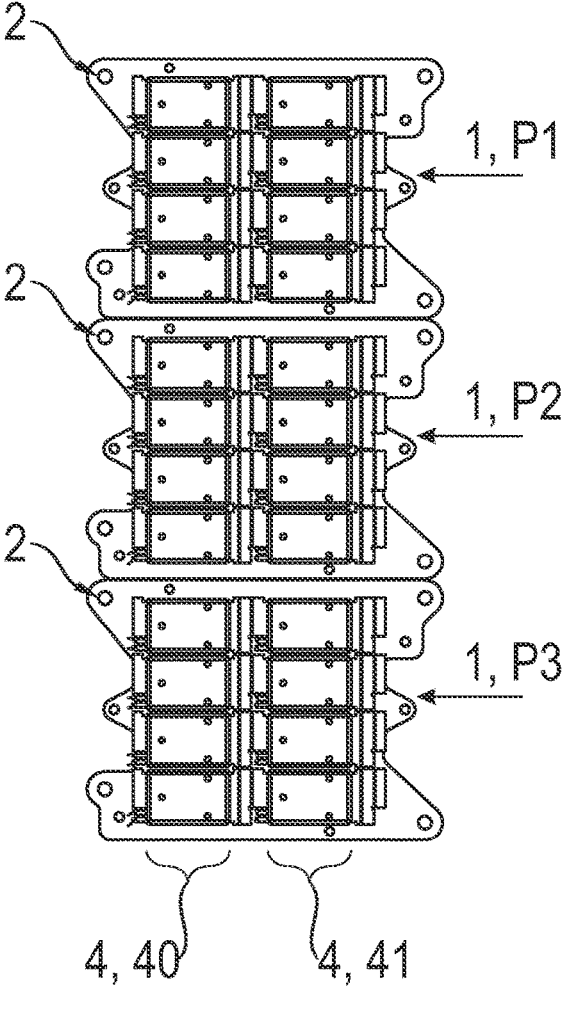
Figure 5:
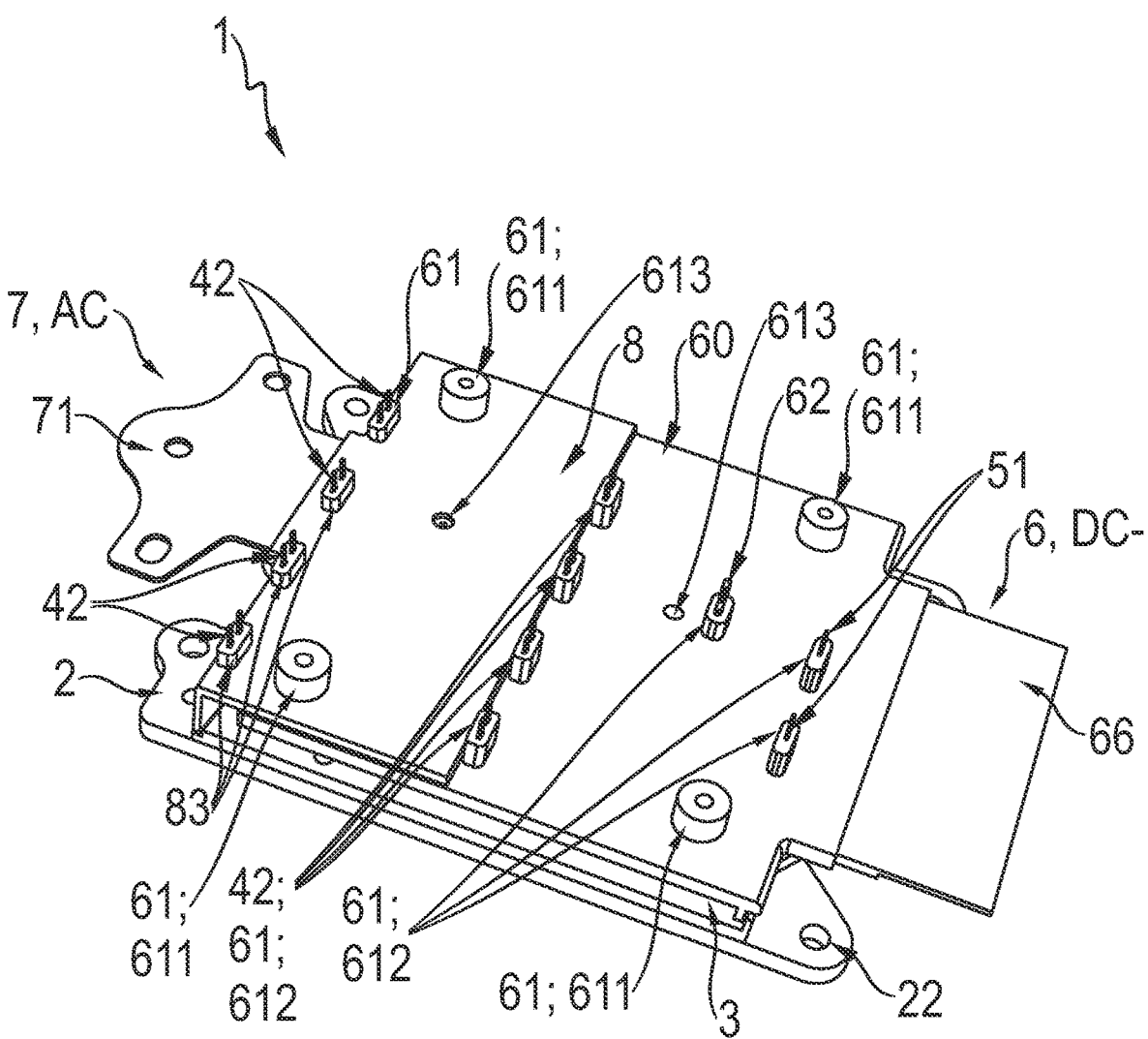
FIG. 5 shows a single-phase module having conductor rails arranged on the semiconductor package, according to one embodiment of the present invention.

On the grounds that, for each embodiment of the single-phase module 1, a dedicated geometry is provided. A plurality of single-phase modules 1 can thus be interconnected to form a multi-phase module, particularly a three-phase module as represented in FIGS. 3 and 4. Moreover, by the adaptation of the geometry of the baseplate 2, and thus of the conductor rails 5-7, i.e. the arrangement and surface area thereof, to the number and type of semiconductor packages 4, the commutation cell is optimized, as described in greater detail hereinafter.

By the option for the adaptation of the geometry of the baseplate 2, semiconductor packages 4 from different manufacturers can be employed, thereby enhancing availability. A scalable power capacity is thus conceivable, as is the employment of different semiconductor packages 4 for different single-phase modules 1, as geometry can be adapted to the size and type of chips (power semiconductors) employed, in a manner not previously known from the prior art. In this case, scalability is achieved with respect to the number of chips only, whereas the size of the baseplate 2 and the requisite surface area of the conductor rails 5-7 remain unchanged.

As mentioned above, a consistent objective in the design of a circuit arrangement is the achievement of low-loss commutation (switchover of current from one power semiconductor to the other) in the half-bridges. It is thus important that the commutation cell (semiconductor switches and the series-connected diode and associated voltage source) should be optimized.

Figures 28, 29:
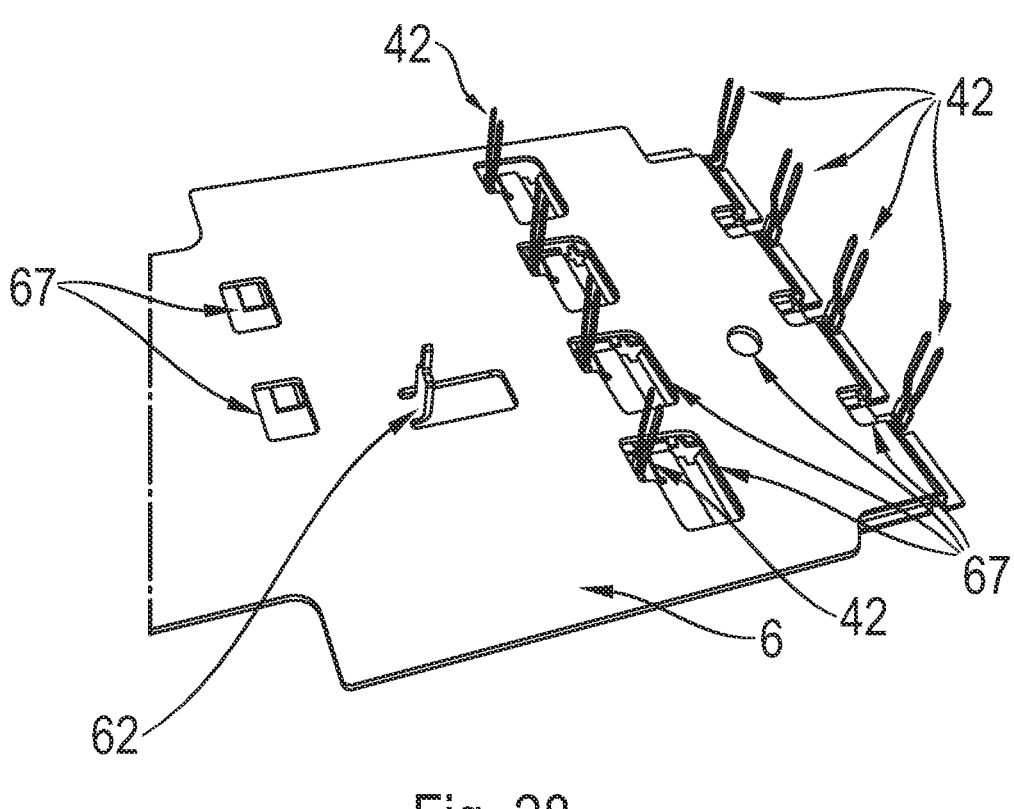
FIGS. 28 and 29 show an arrangement of a DC-negative conductor rail on the semiconductor package of a single-phase module, according to one embodiment of the present invention.

Optimization is achieved, as described above, by an arrangement and surface area of the conductor rails 5-7, i.e. of the DC-positive conductor rail 5, the DC-negative conductor rail 6 and the AC conductor rail 7 which are adapted to the topology of the single-phase module 1. As shown in FIGS. 28 (overhead view) and 29 (sectional view), for the optimization of the commutation cell in a further embodiment, one of the conductor rails, particularly advantageously the DC-negative conductor rail 6, can be configured in a full-surface arrangement over the semiconductor packages 4. This means that at least the semiconductor packages 4 (including the power taps thereof) are covered in full. The DC-negative tap 66 projects from the single-phase module 1 in order to permit the external tap-off of power, as represented e.g. in FIG. 6. The two other conductor rails 5 and 7 are respectively routed below and above the DC-negative conductor rail 6 wherein, advantageously, the DC-positive conductor rail 5 is routed on the side of the baseplate 2, and the AC conductor rail 7 is routed above the DC-negative conductor rail 6. By the full-surface routing of the DC-negative conductor rail 6 over the semiconductor packages 4, the DC-positive tap 53 and the DC-negative tap 66 can advantageously be configured on the same side of the single-phase module 1, wherein this side is advantageously arranged in opposition to the AC tap 71 of the AC conductor rail 7, as can be seen e.g. in FIGS. 6 and 8 to 10, which additionally show features of the cladding 50, 60 of the conductor rails 5, 6, as described hereinafter.

In the embodiment in which the DC-negative conductor rail 6 is routed in a full-surface arrangement above the semiconductor packages 4, it comprises openings 67, by means of which high-voltage power and/or signal pins 42 of semiconductor packages 4 and/or power pins 51 of the DC-positive conductor rail 5 which is situated thereunder can be led upwards (to the upper side) of the DC-negative conductor rail 6, and by means of which the AC power terminals 70 of the AC rail 7 which is situated above the DC-negative conductor rail 6 can be led through to the AC taps 71 of the semiconductor packages 4 (in FIGS. 28 and 29, in the region of the central pins 42) on the underside of the DC-negative conductor rail 6. Additionally, one or more openings 67 can be provided in the DC-negative conductor rail 6, in order to allow one or more temperature sensors 106 to be led through to the underside of the DC-negative conductor rail 6, in order to measure the temperature of semiconductor packages 4.

Moreover, a HV-negative power terminal pin 62 can be bent upwards from the DC-negative conductor rail 6 (away from the semiconductor packages 4), in order to deliver a DC-negative potential for components, such as CY capacitors, which are arranged on the signal busboard 10 described hereinafter.

As the DC-negative conductor rail 6 is configured in a full-surface arrangement over the semiconductor packages 4, unwanted electrical interactions can occur with components which are arranged thereover or thereunder, particularly the DC-positive and AC conductor rails 5, 7. In one embodiment, full cladding 60 of the DC-negative conductor rail 6 is therefore provided in those regions where it overlaps the other conductor rails 5, 7, and is thus not electrically contact-connected with the latter, for the purposes of the electrical insulation thereof from their environment, particularly the DC-positive and AC conductor rails 5, 7. Cladding 60 is thus absent only from the DC-negative tap 66, at which the HV-negative power terminal pin 62 bends upwards from the DC-negative conductor rail 6, and from the DC-negative power terminals of the semiconductor packages 4 (bending outwards and downwards at the far right of FIG. 28). This is represented e.g. in FIGS. 5 and 14-18.

Cladding 60, in a manner which is known from the prior art and is thus not described in any greater detail, is formed of an electrically insulating material, preferably a molding material, which is thus appropriate for encapsulation or overmolding (by a flow process). By the wording to the effect that cladding 50, 60 is formed of an electrically insulating material, with respect to the components described hereinafter—the insulating insert 8 and the insulating frame 3 of the single-phase module 1—it is to be understood (in a preferred embodiment), both that cladding is applied to a base structure, e.g. of sheet metal, e.g. by overmolding, and that components of the single-phase module 1 are completely formed of the electrically insulating material.

As described above with respect to the full-surface arrangement of the DC-negative conductor rail 6 over the semiconductor packages 4, cladding 60 comprises openings 613-616 for the feedthrough of various components from the underside thereof, facing the baseplate 2, to the opposing upper side thereof (or vice versa). The opening 613-616 naturally correspond to the openings 67 in the DC-negative conductor rail 6, and thus coincide with the latter.

Figures 16, 17, 18:
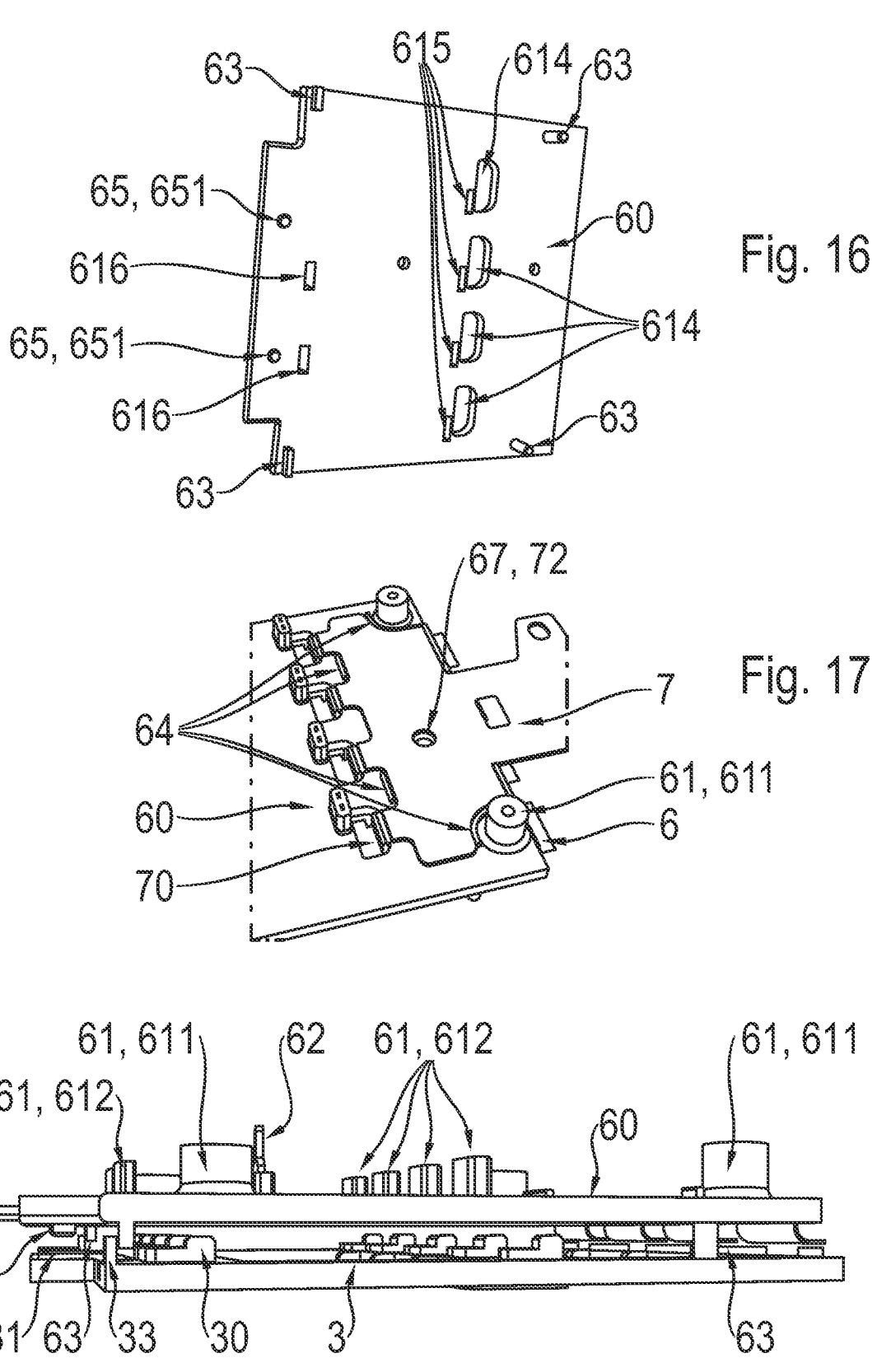
FIGS. 16, 17, and 18 show a sheathed conductor rail, an AC conductor rail fixing and the arrangement of the sheathed conductor rail on an insulating frame, according to one embodiment of the present invention.

Specifically, one or more openings 613 in the cladding 60 can be provided for the lead-in of one or more temperature sensors 106 on the underside of the DC-negative conductor rail 6, for the temperature measurement of semiconductor packages 4. Moreover, a plurality of openings 614 (or at least one) are provided for the lead-in of the AC power terminal 70 of the AC rail 7 to the AC taps of the half-bridges, as represented in FIG. 17, from the upper side to the underside of the DC-negative conductor rail 6. Moreover, a plurality of openings 615 (or at least one) are provided, as represented in FIG. 16 (underside view), for the lead-in of power and/or signal pins 42 of the semiconductor packages 4 to the upper side of the DC-negative conductor rail 6 and the contact-connection thereof with the signal busboard 10 described hereinafter. Additionally, a plurality of openings 616 (or at least one) are provided for the lead-in of HV-positive power terminal pins 51 of the DC-positive conductor rail 5 which, in a preferred embodiment, are arranged below those of the DC-negative conductor rail 6, to the upper side of the DC-negative conductor rail 6. Naturally, on the underside, no opening is provided for the HV-negative power terminal pin 62, as the latter is bent out from the upper side of the DC-negative conductor rail 6, and is embedded in the cladding 60.

Cladding 60 on the upper side of the DC-negative conductor rail 6 comprises domes 61 which project upwards from the upper side thereof, and which function as tunnels 612 for the pins 42, 51, as represented e.g. in FIGS. 5, 14, 15 and 18. Upon fitting, pins 42, 51 are led through the tunnels 612. The domes 61 are thus an element of the cladding 60 (in that they are formed thereof by the same process, and are not built-on structures), and are formed of the same material. They are configured with a hollow interior, in order to permit the feedthrough of pins 42, 51, and thus function as tunnels 612, as can be seen in section, e.g. in FIG. 15. These tunnels 612 thus execute a function, both for the electrical insulation of pins 42, 51, 62 at the low-voltage potential, and for the positioning and fixing of pins 42, 51. The tunnels 612 thus project from the upper side to the extent that they also project beyond the upper side of a planar component 9 which is provided in a further embodiment, and is described hereinafter.

The HV-negative power terminal pin 62 is secured in its associated tunnel 612, as it projects from the upper side of the DC-negative conductor rail 6 and is directly enclosed by the cladding 60 in the manufacturing process, i.e. is embedded therein.

Figure 13:
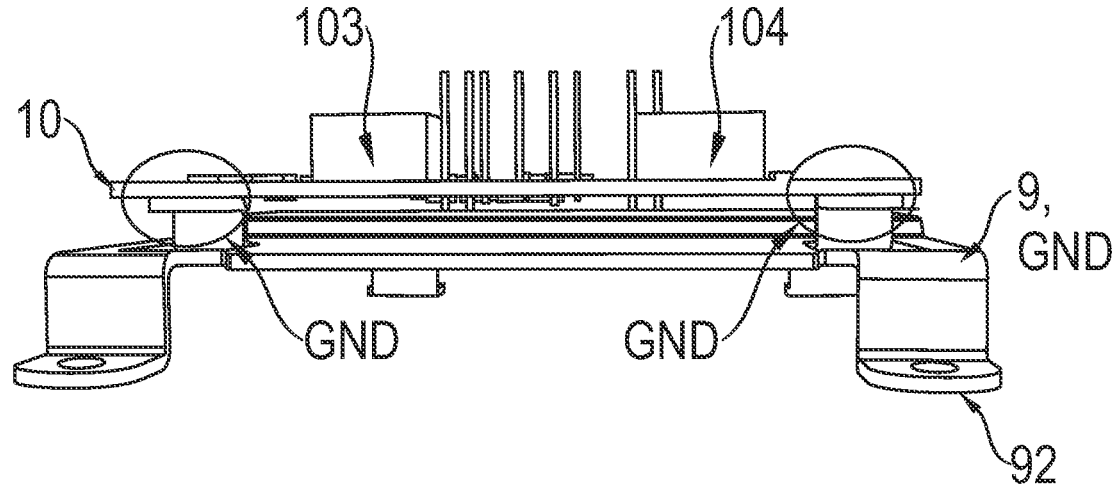
Figure 14:
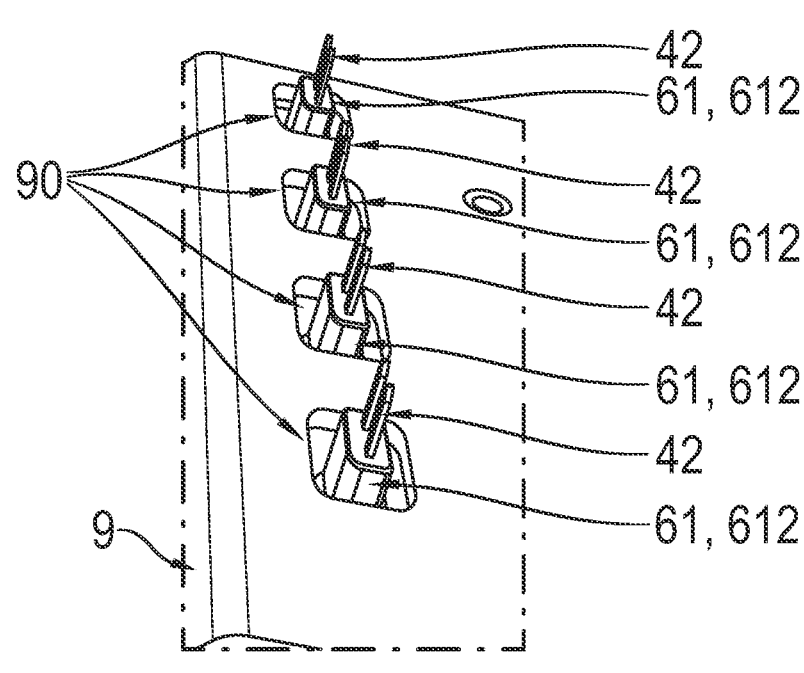
FIGS. 14 and 15 show an overhead view of the single-phase module and a sectional view of the single-phase module according to FIG. 6, and the claddings of power or signal pins, according to one embodiment of the present invention.
Figure 15:
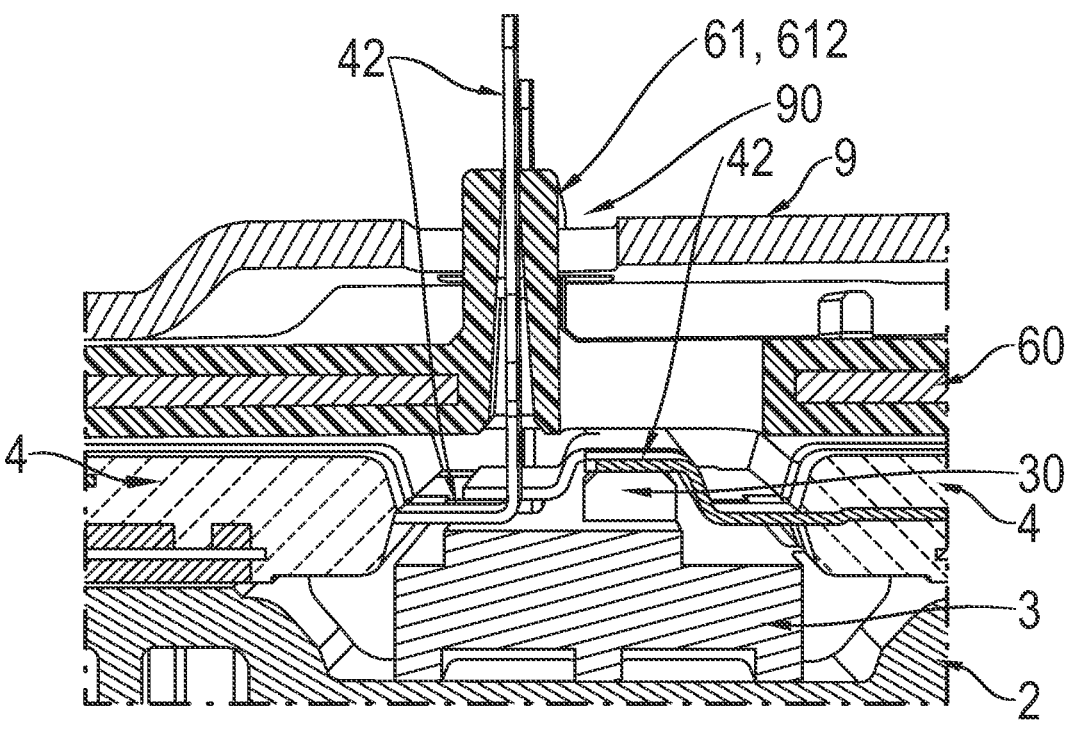

In a further embodiment, which is also combinable with the above-mentioned embodiment, positioning structures which project from the upper side of the cladding can be configured in the form of domes 61, which function as seatings 611 for components which are arranged above the DC-negative conductor rail 6, e.g. the above-mentioned planar component 9 described hereinafter, or the likewise above-mentioned signal busboard 10 described hereinafter. These domes 61, which function as a seating 611, can likewise comprise an opening, e.g. in order to permit a screw fixing to the baseplate 2, thus permitting a GND (ground) contact connection, as represented e.g. in FIG. 13. However, they can also be screwed to other components and/or can function as a positioner.

In a further embodiment, which is also combinable with the above-mentioned embodiment, the cladding 60, on one or both sides of the DC-negative conductor rail 6, can comprise positioners in the form of positioning structures 63, geometries in the form of engagement regions 64, and plug-in structures 65, as represented e.g. in FIGS. 16 (underside) and 17 (upper side). Advantageously, these are formed directly in the manufacturing process of the cladding 60, and are thus an element of cladding (rather than built-on structures). Positioners are configured such that they can engage with corresponding mating structures of components which are to be (mechanically and/or electrically) connected to the DC-negative conductor rail 6, e.g. the insulating frame 3 of the AC conductor rail 7 (or mating structures are correspondingly configured such that they can engage with corresponding positioners, depending upon which arrangement can be more effectively produced by process technology).

In FIG. 16, positioning structures 63 are configured at the outer edge regions of the underside of cladding 60. These can be configured in the form of pins (as per the right-hand side of FIG. 16) or as longitudinal barriers, e.g. in the form of ribs (as per the left-hand side of FIG. 16), depending upon the configuration of the mating structure on the underside thereof, with which they are to engage. For example, they can be employed as positioners on the baseplate 2, or on one of the insulating frames 3 (e.g. in FIG. 18) which is provided on the baseplate 2. To this end, the baseplate 2 or insulating frame 3 comprise corresponding mating structures such as e.g. positioning structures 30 (seatings) and 33 (ribs), as represented in FIG. 18.

In FIG. 16, moreover, plug-in structures 65 are provided (left-hand side of FIG. 16). These are employed as positioners for the arrangement of the DC-negative conductor rail 6 on the DC-positive conductor rail 5, as represented e.g. in FIGS. 37/38 and 43. Plug-in structures 65 can be configured in the form of a projection 651 (pin), as represented in FIG. 16. In the embodiments represented, positioners of the DC-negative conductor rail 6 are configured in the form of a projection 651, and the mating part (complementary plug-in structure) on the side of the DC-positive conductor rail 5 is configured in the form of a cut-out 522, wherein the reverse arrangement is also possible. The number of plug-in structures 65 is dependent upon the width of the DC-positive tap 53 of the DC-positive conductor rail 5. Advantageously, (at least) two plug-in structures 65 are provided, in the outermost arrangement possible, i.e. in an outer edge region of the cladding 60. Advantageously, the plug-in structures 65 assume a circular shape. They can thus interlock in a secure arrangement (as per a pushbutton), or can interlock with a degree of play, by means of which assembly is simplified, albeit with a reduction in the accuracy of positioning.

It would also be possible to provide only a single plug-in structure 65 wherein, in place of a circular shape, advantageously, a shape is preferred into which the mating structure can be inserted in one orientation only. Any rotation can thus be prevented.

In FIG. 17, engagement regions 64 are provided for the AC conductor rail 7 on the upper side of the DC-negative conductor rail 6, by way of positioners. Engagement regions 64 are configured with geometries which are adapted to the shape of the AC conductor rail 7, such that they can be employed as positioners for the latter. A number of engagement regions 64, configured in the form of ribs, are provided between the openings 614 into which the AC power terminals 70 are introduced, such that the surfaces between the limbs of the AC power terminals 70 can engage therein. As represented in FIG. 17, it is also possible for only one engagement region 64 to be provided on each two surfaces between the limbs of the AC power terminals 70. Preferably, engagement regions 64 are evenly distributed, such that no rotation of the AC rail 7 is possible. Further engagement regions 64 are additionally provided at the outer edge regions of the cladding 60, which frame the AC conductor rail 7, together with the above-mentioned engagement regions 64, such that the latter can be arranged in the desired position on the DC-negative conductor rail 6, and can also not be moved or rotated, or only to a limited extent. In FIG. 17, these outer engagement regions 64 are configured in the form of beads which curve in the direction of the AC rail 7, with a curvature which matches the radius of the domes 61 which function as seatings 611. The AC conductor rail 7 also assumes a corresponding radius, such that it can engage with the beads, as represented in FIG. 17. However, the shape of the engagement regions 64 is not restricted to the embodiments represented. Instead, any shape can be preferred which positions the AC conductor rail 7 and provides at least minor protection against any slippage and/or rotation. The engagement regions 64 are thus advantageously adapted to the shape of the AC conductor rail 7.

Advantageously, the engagement regions 64 are configured such that the AC conductor rail 7 is applied thereto from above, and can thus not be inserted therein. Naturally, the AC conductor rail 7 can also comprise openings 72, in order to permit the feedthrough of components, such as e.g. a temperature sensor 106, to the underside of the DC-negative conductor rail 6.

Figures 30, 31, 32, 33, 34:
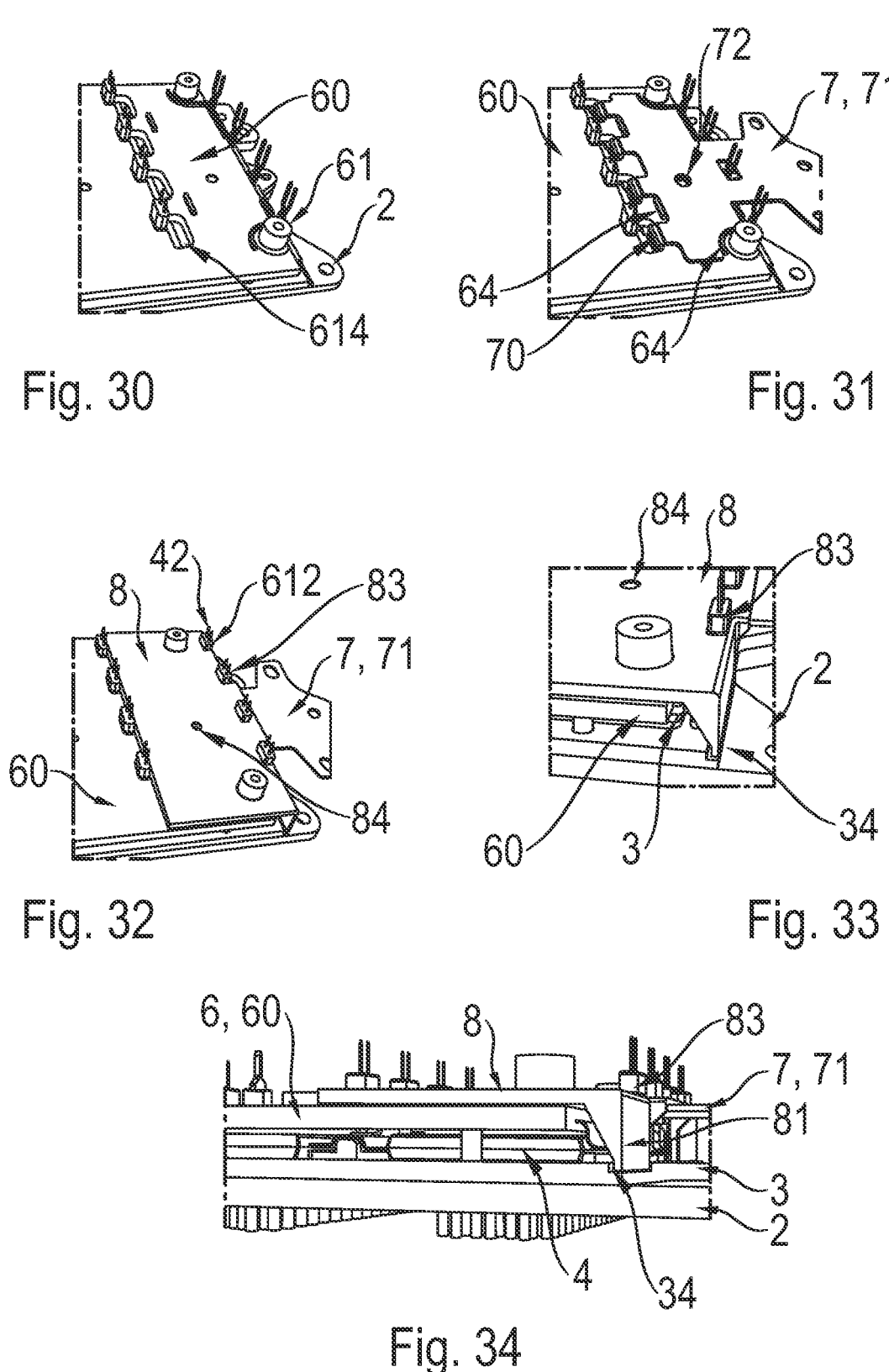
FIGS. 30, 31, 32, 33, and 34 show an arrangement of an AC conductor rail on a DC-negative conductor rail having an insulating insert in a single-phase module, in various sectional views of the assembly, according to one embodiment of the present invention.
Figures 35, 36, 37, 38, 39, 40, 41, 42:
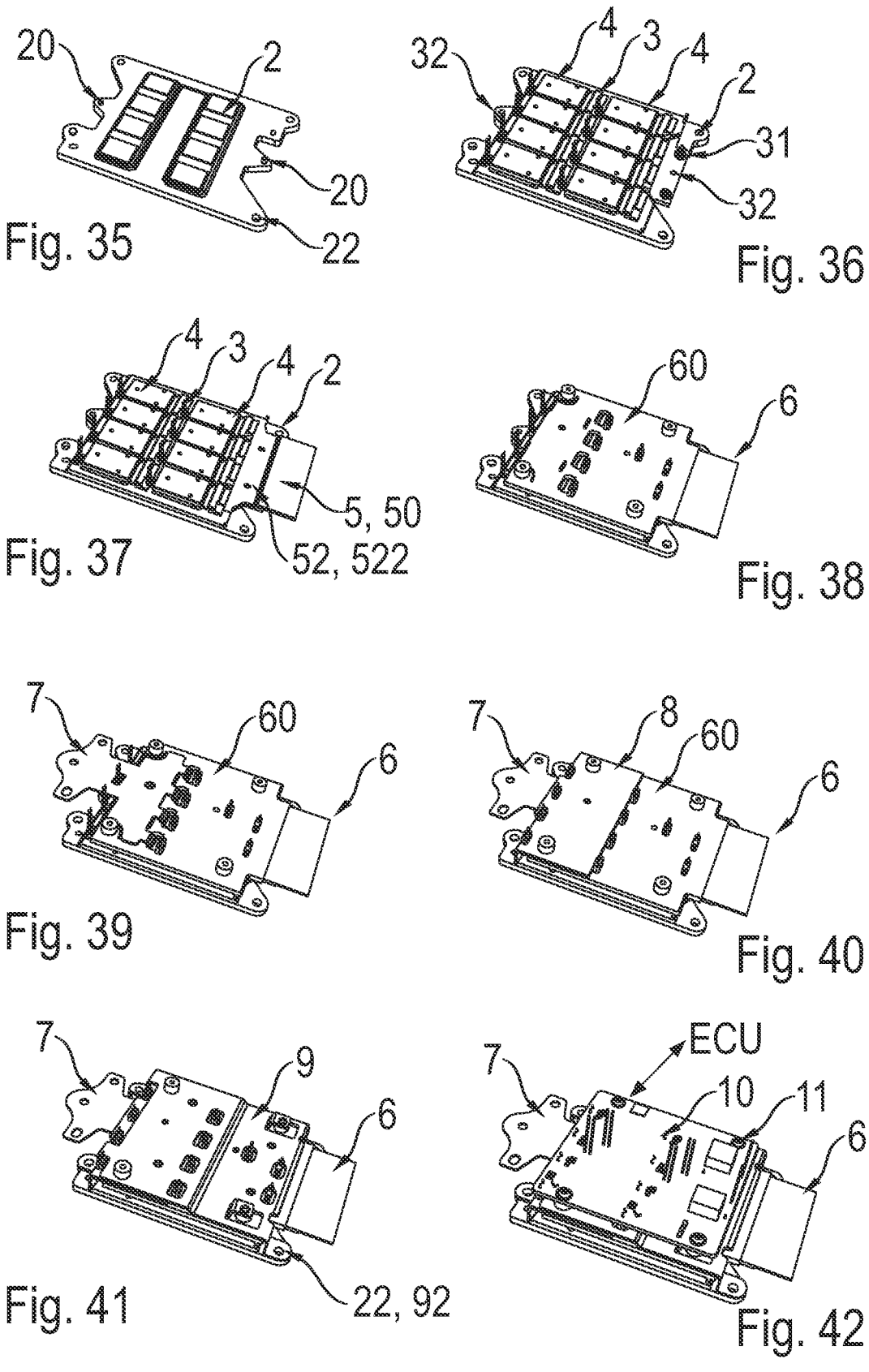
FIGS. 35, 36, 37, 38, 39, 40, 41, and 42 show a layout of a single-phase module according to one embodiment of the present invention, in various sectional views of the assembly.
Figure 43:
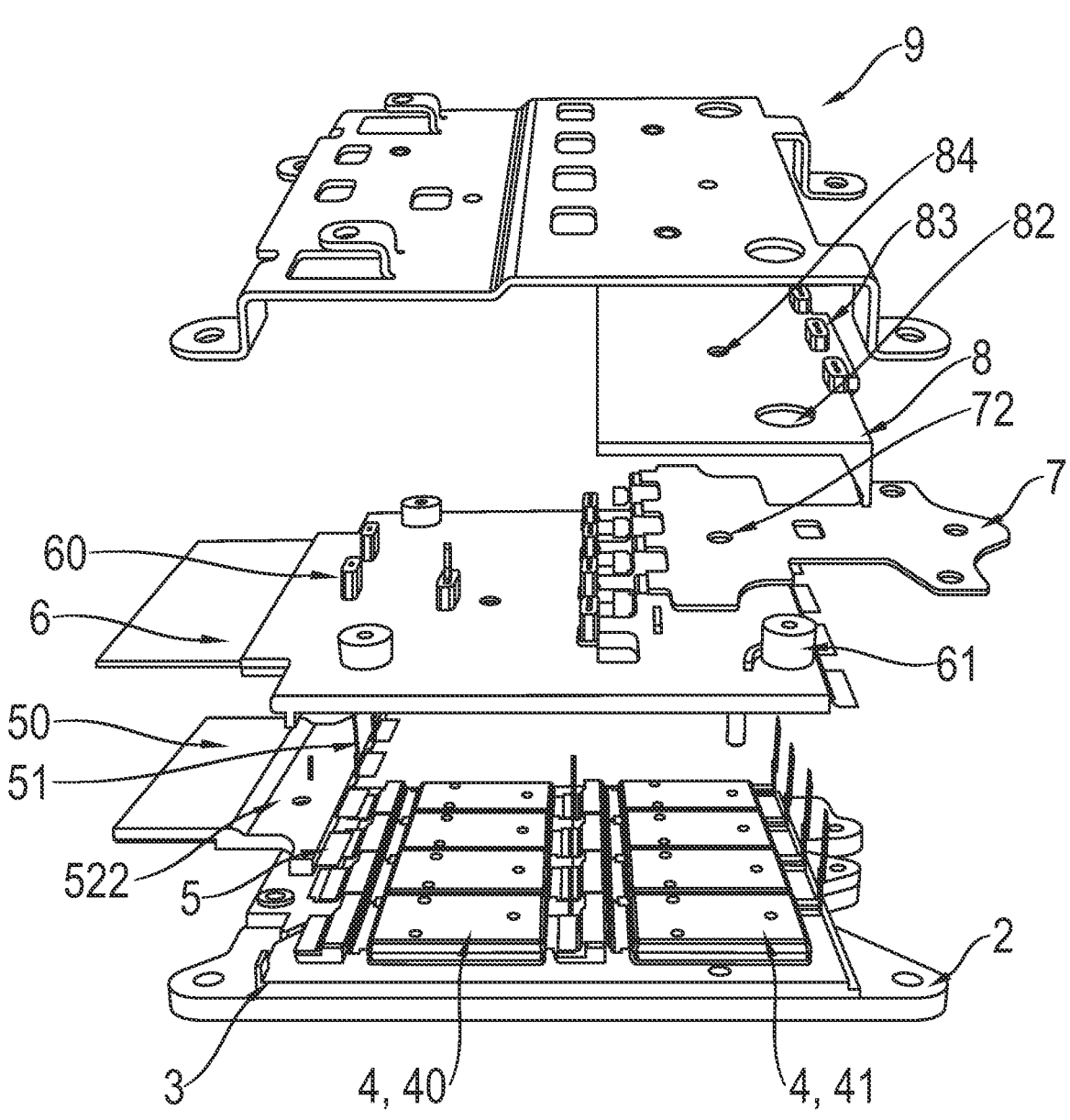
FIG. 43 shows an exploded view of a single-phase module, with no signal busboard, according to one embodiment of the present invention.

In an embodiment which is represented in detail in FIGS. 30 to 34, an insulating insert 8 is provided which (at its underside) is or can be arranged above the AC conductor rail 7 or, more specifically, applied thereto. The insulating insert 8 is formed of an electrically insulating material, and functions as an electrical insulation. In the embodiment represented, the AC conductor rail 7 is arranged above the DC-negative conductor rail 6, and engages with the latter. In order to prevent any unwanted electrical interactions, the DC-negative conductor rail 6 is enclosed in an electrically insulating cladding 60, as described above and also represented in FIG. 30. The AC conductor rail 7 is applied thereto, as represented in FIGS. 31, 39 and 43. Only then is the insulating insert 8 fitted, as represented in FIGS. 32, 40 and 43.

The insulating insert 8, at its upper side (which does not engage with the conductor rail 6), advantageously comprises one or more openings 82, in order to permit the plug-in of domes 61 which project from the DC-negative conductor rail 6, as represented in FIGS. 30-34 and 39 to 43. The openings 82 and the domes 61, 611 thus function as positioners for the insulating insert 8.

The insulating insert 8 moreover comprises domes, which function as tunnels 83 for the lead-in of power and/or signal pins 42 of the semiconductor packages 4 to the upper side, in order to permit the contact-connection thereof with a signal busboard 10 which is described hereinafter. These tunnels 83, as per the tunnels 612 formed with respect to the cladding 60 of the DC-negative conductor rail 6, are thus formed from the cladding of the insulating insert 8, and are also employed for the fixing (at least in the horizontal direction) and positioning of the insulating insert 8 during assembly.

Figure 7:
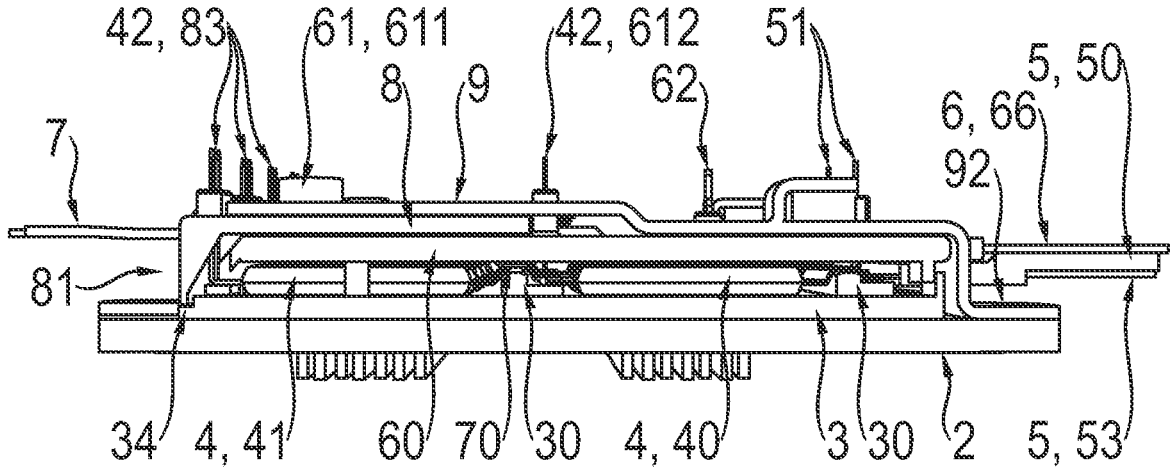

Advantageously, the insulating insert 8 further comprises, at its outer edge region, a bevel in the direction of the DC-negative conductor rail 6 (at the edge region 81, represented e.g. in FIGS. 7, 33 and 34). This surface (the edge region 81) is essentially oriented perpendicularly to the surface of the insulating insert 8, such that electrical insulation is also provided with respect thereto wherein, naturally, the AC tap 71 projects to the exterior of the conductor rail stack. The edge region 81 at least projects downwards to the extent that the outer regions of the DC-negative conductor rail 6 are also covered thereby, as can be seen in FIG. 34. In one embodiment, the edge region 81 is also employed as a positioner and a fixer, as can be seen in FIG. 34, by the engagement thereof with a step edge (limit stop) and the application thereof to a step platform (seating), which are provided by way of a positioning structure 34, particularly by means of an insulating frame 3, which is employed as a positioner and is described hereinafter. This step edge and step platform can also be formed by the baseplate 2, or by another component of the single-phase module 1 which is present below the insulating insert 8.

For positioning the insulating insert 8, positioners are employed, which are provided on the cladding 60 of the DC-negative conductor rail 6, and have previously been described in this context. Specifically, positioners for the insulating insert 8 are comprised of the domes 61, 611 formed from the cladding 60 of the DC-negative conductor rail 6, by means of which fitting to an opening 82 formed in the insulating insert 8 is achieved, openings 614 via which the power terminal(s) of the AC conductor rail 7 is (are) fed through to the AC power taps of the semiconductor packages 4, and engagement regions 64 for the AC conductor rail 7. These are formed from the cladding 60 of the DC-negative conductor rail 6, such that the AC conductor rail 7 is delimited by outer regions thereof. These are configured such that the AC conductor rail 7 cannot be inserted, but must be applied (from above).

The insulating insert 8 can comprise at least one opening 84 for the accommodation of a temperature sensor 106, which corresponds to the overlying openings 67 and 72 in the DC-negative conductor rail 6 (and in the cladding 60 thereof) and in the AC conductor rail 7.

The insulating insert 8 can be secured by fastening structures. In a further embodiment, however, a planar component 9 is provided, which functions both as a hold-down device for the entire plate stack (the conductor rails 5-7), and for the insulating insert 8, and as an EMC shield. A planar component 9 of this type is represented e.g. in FIGS. 6-8, 14, 15 and 43. This component is essentially configured such that it forms the upper side of the single-phase module 1 described, i.e. is essentially applied to the conductor rail stack (including the insulating insert 8). In the embodiments described, it thus engages with the upper side of the cladding 60 of the DC-negative conductor rail 6 and the insulating insert 8. In an alternative embodiment, the underside of the planar component 9 can also comprise an electrically insulating cladding.

The planar component 9 comprises a plurality of fastening structures such as lugs 92, which extend beyond the outer end regions of the conductor rail stack (including the insulating insert 8 and the insulating frame 3, where present) to the baseplate 2, and are secured thereto. The outline of the planar component 9 preferably matches the outline of the upper side, as can be seen e.g. in FIGS. 6 and 7. Insofar as possible, full-surface contact should be provided, particularly in the interests of effective EMC shielding, but also for the fixing of underlying components, in order to prevent e.g. any rattling. The component comprises openings 90 and/or cut-outs 91, in order to permit the projection of domes 61 (seatings 611, tunnels 612) und, optionally, of further components such as temperature sensors 106, from the underside to the upper side thereof. At its outer end regions, the component advantageously comprises lugs 92, which encompass the conductor rail stack (including the insulating insert 8 and the insulating frame 3, where present) and extend to the baseplate 2, for fastening thereto (at fixing holes 22), thereby securing components which are arranged between the baseplate 2 and the planar component 9, as can be seen e.g. in FIGS. 6-8 and 11. The component thus functions as a hold-down device. As can be seen from the figures, for the attachment of lugs 92, the baseplate 2 comprises one or more fixing holes 22 at the outer ends thereof.

In one embodiment, the planar component 9 also assumes an electrical insulation function, and functions as an EMC shield (EMC=electromagnetic compatibility). To this end, the openings 90 through which the tunnels 612 are led are configured with larger dimensions than are required for feedthrough only. The clearance to the tunnels 612 in which power and/or signal pins 42 of the semiconductor packages 4 are routed, which are of sufficient height such that projection of the power and/or signal pins 42 only occurs above the surface of the planar component 9, thus permitting contact-connection, is dependent upon the air gap which is required for the application concerned, which will be defined by a person skilled in the art in accordance with known provisions. Openings 90 through which the tunnels 612 are led are thus configured such that a stipulated air gap is maintained between pins 42, 51, 62 thus fed through and the planar component 9.

By means of the openings 90 and the feedthrough of components from the underlying layers, the planar component 9 functions as an enclosure (EMC shield) between the high-voltage region (underside) and the signal region (upper side). It simultaneously functions as a fixing (hold-down device).

As the planar component 9 is formed of an electrically conductive material and is connected to the baseplate 2, it can also function as a ground potential (GND) for components which are connected thereto. This function can be employed e.g. for the ground connection of components of the signal busboard 10, e.g. CY capacitors. To this end, it is provided that a subregion of the planar component 9 engages with one of the domes 61 (FIGS. 6 and 7) to which the signal busboard 10 is later to be fastened, as represented in FIGS. 9-11 and 13, and described hereinafter. By the fastening of the signal busboard 10 to the subregion of the planar component 9 which is connected to the baseplate 2, and the resulting provision of a ground potential GND, a ground potential GND is also provided for components of the signal busboard 10.

Figures 8, 9:
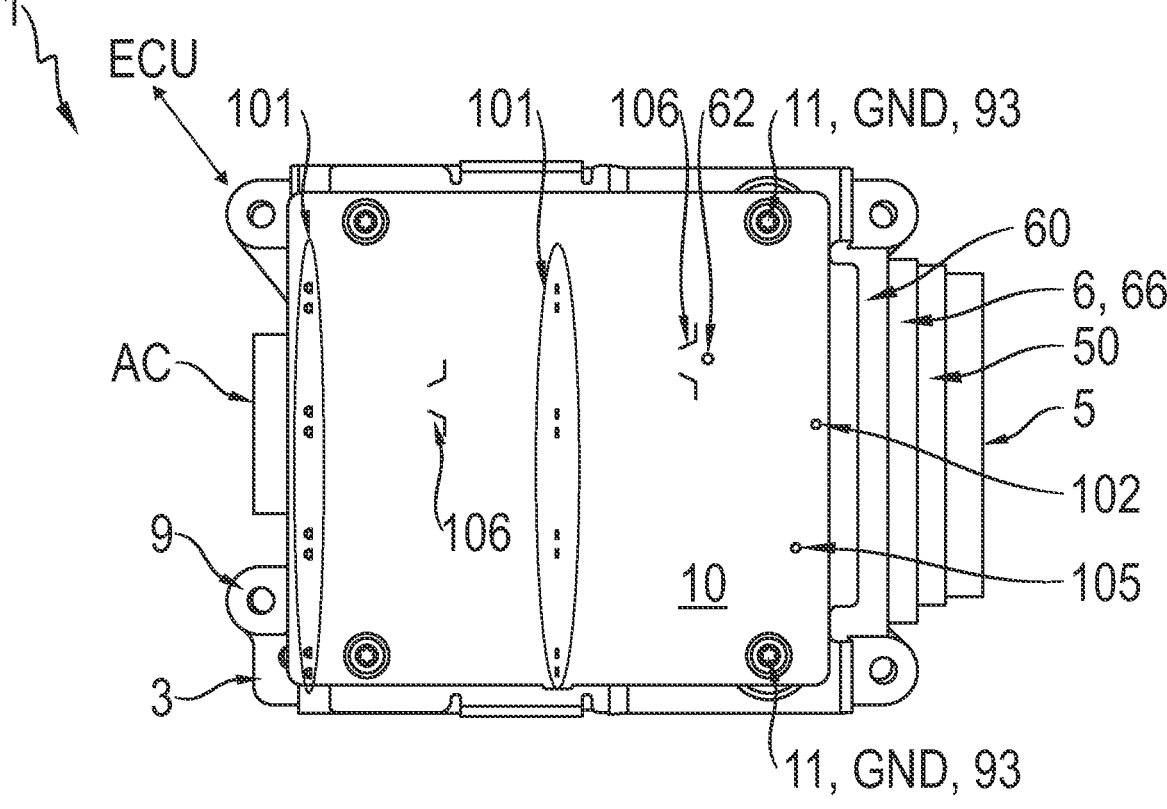
FIG. 9 shows a single-phase module of a signal busboard which is arranged above the conductor rails, according to one embodiment of the present invention.

In one embodiment, a signal busboard 10 is provided on the upper side of the single-phase module 1 described, i.e. the upper side of the conductor rail stack. If a planar component 9 is provided, the signal busboard 10 is also arranged above this component, as represented in FIGS. 9 to 11 and 42. The signal busboard 10 is thus arranged at the very top of the single-phase module 1. This functions as a contact-connection and junction point for pins which are fed through to the upper side of the conductor rails 5 to 7 (also projecting through the insulating insert 8) and are led through to the top of the planar component 9, i.e. the power/signal pins 42 of the semiconductor packages 4, the HV-positive power terminal pins 52, and the HV-negative power terminal pins 62. The signal busboard 10 is a circuit board in or upon which signal lines are routed and components are arranged. In FIG. 9, reference number 101 identifies those regions which are employed as pin openings for high-side/low-side and gate/Kelvin source pins which are designated as power and/or signal pins 42 of the semiconductor packages 4. Screw connections identified by "GND" (at the fastening 93) between the signal busboard 10 and the planar component 9 serve as a ground potential GND for components described hereinafter which are arranged on the signal busboard 10 wherein, by means of the connection (at the lugs 92) between the planar component 9 and the baseplate 2, a ground contact-connection with the baseplate 2 is provided. These "GND" screw connections are always arranged on the side of the single-phase module 1 on which the taps 53, 66 of the DC conductor rails 5, 6 project to the exterior.

By means of the signal busboard 10, symmetrical power distribution on the semiconductor packages 4 can be achieved by means of the decoupling of the individual gates of semiconductor packages 4 via a resistor-capacitor network (RC element) on the signal busboard 10, in order to permit the uniform distribution of power on the individual semiconductor packages 4.

Figure 10:
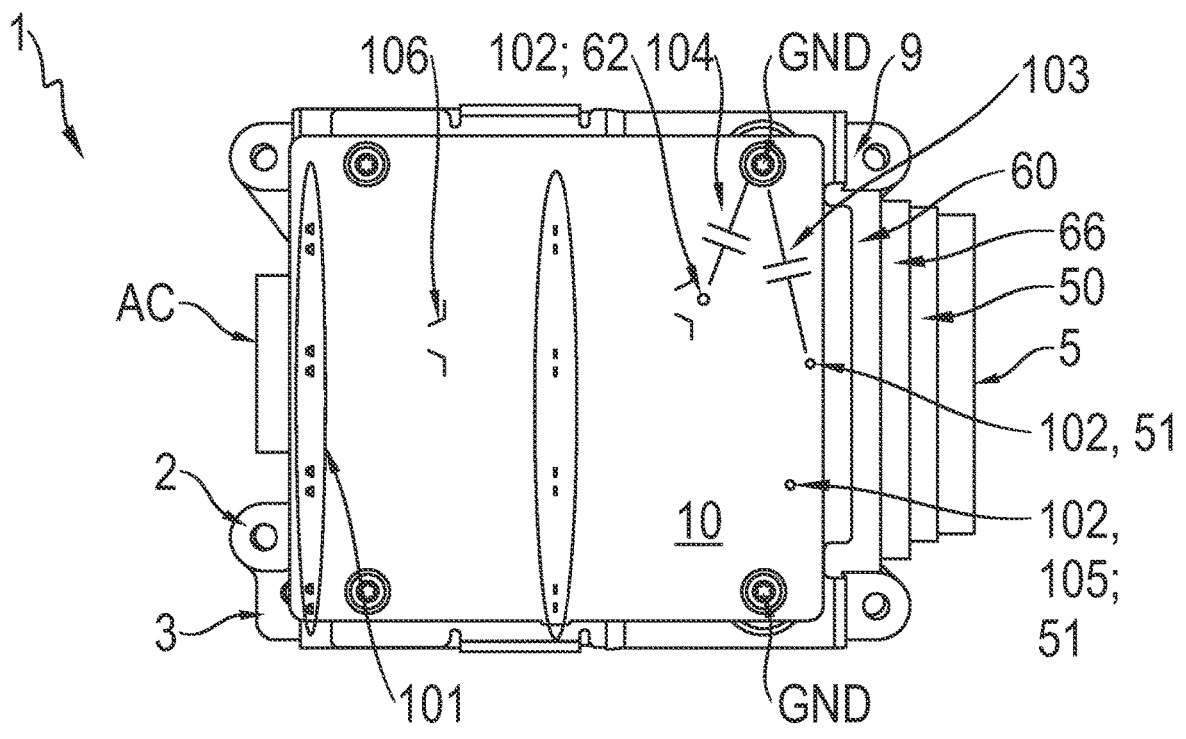
FIGS. 10, 11, 12, and 13 show overhead views of the single-phase module and front views of the single-phase module according to FIG. 6, having additional components which are arranged on the signal busboard, according to one embodiment of the present invention.
Figure 11:
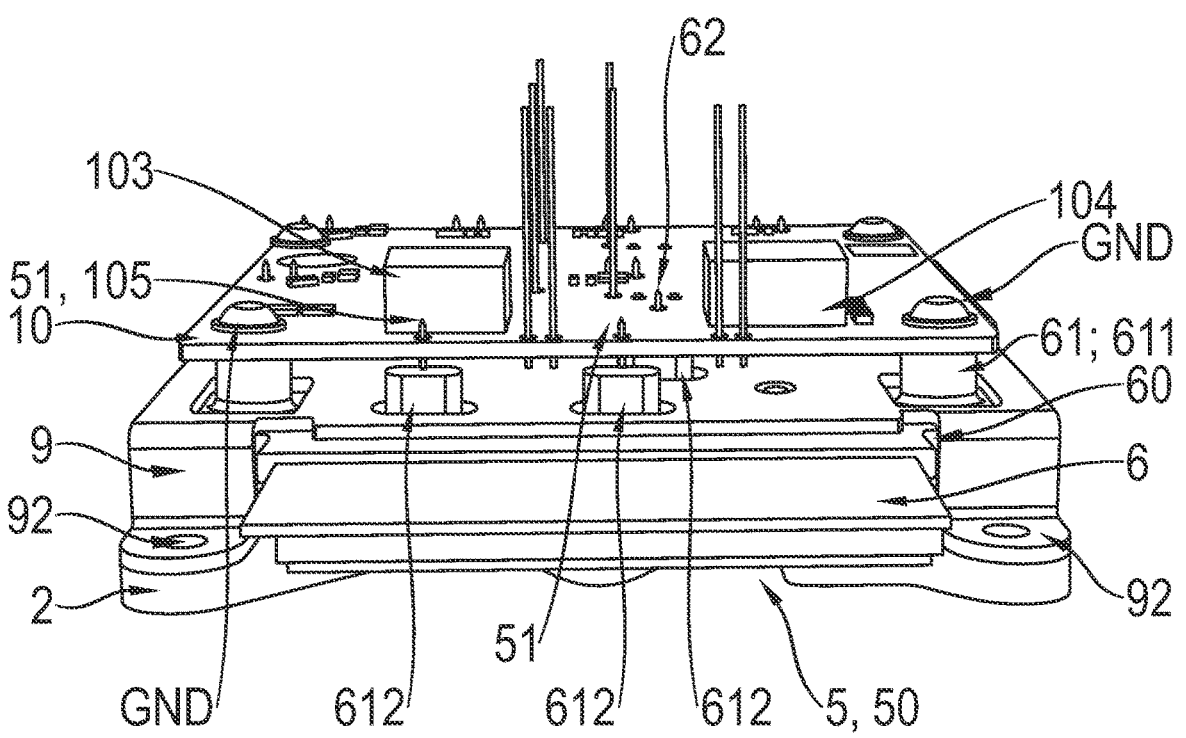

On the signal busboard 10, on the grounds of the GND connection which is routed thereto, one or more safety capacitors 103, 104, or "CY capacitors" are arranged. These are employed for the smoothing of voltage and, in each case, are contact-connected between a power terminal, i.e. between the DC-negative potential (power terminal pin 62) and the ground potential GND (CY capacitor 104) or between the DC-positive potential (power terminal 51) and the ground potential GND (CY capacitor 103), as indicated in FIG. 10 and represented in an exemplary manner in FIG. 11. To this end, the signal busboard 10 also comprises an opening 107 for the GND terminal (e.g. screws 11, as indicated in FIG. 42), and a respective opening 102 for the HV power terminal pin(s) 51 and/or 62. By the option for the arrangement of CY capacitors in very close proximity to the semiconductor packages 4, and in a single-phase module 1, EMC benefits are achieved in comparison with the existing prior art, wherein disturbances such as voltage ripple can be reduced or eliminated at source.

On the signal busboard 10, moreover, one of the DC-positive pins, more specifically one of the HV-positive power terminal pins 51 can be employed as a desaturation pin 105, for the identification of any desaturation of power semiconductors employed in the semiconductor packages 4. The signal is thus looped through directly to the ECU, and processed. By the option for the tap-off of the signal directly at, or in very close proximity to the site of generation, a more accurate detection of desaturation can be achieved. To this end, a dedicated desaturation pin 105 is provided as a contact pin, i.e. a separate HV-positive power terminal pin 51 is provided, in order to permit the acquisition of the cleanest possible signal. This desaturation pin 105 is then no longer employed for the supply of DC-positive power in the (redundant) voltage supply system.

Figure 12:
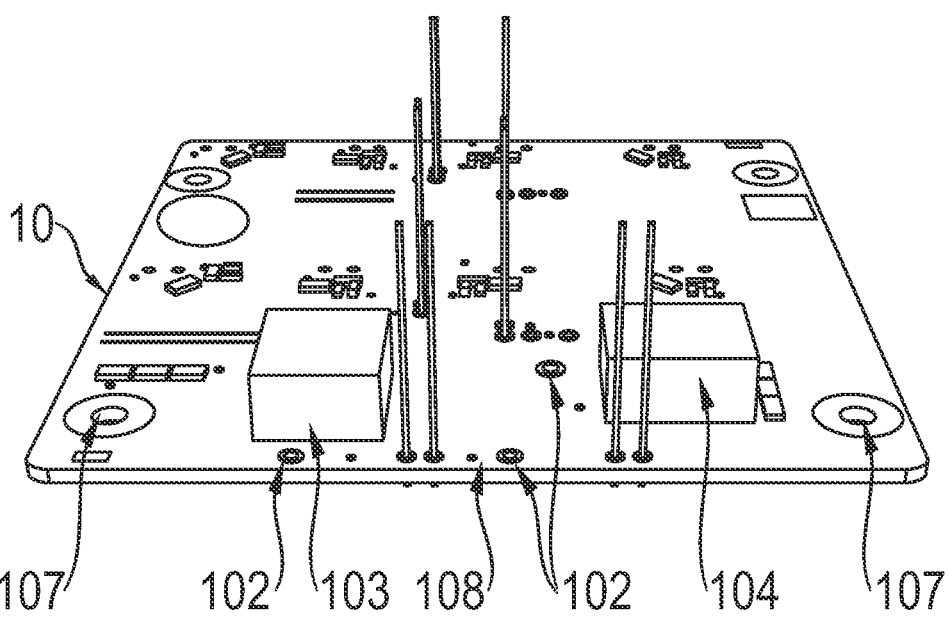

By the option for the connection of semiconductor packages 4 via the signal busboard 10 at full capacity, an EOL test (EOL=end-of-line, i.e. conducted after assembly) can also be executed. To this end, test points 108 can be provided on the signal busboard 10, as indicated in FIG. 12.

In the present case, temperature sensors 106 are not arranged in proximity to the semiconductor packages 4. By means of the signal busboard 10 (optionally), one or more temperature sensors 106 can also be connected to the signal busboard for the direct inspection of the semiconductor packages 4, more specifically, and independently, the high-side 40 and low-side 41 thereof respectively, i.e. for monitoring the temperature thereof. Signals can then be read out from the signal busboard 10, whereafter e.g. the controller of the semiconductor packages 4 can then be adjusted. An improvement of the temperature monitoring of semiconductor packages 4, with respect to accuracy and speed, is permitted accordingly.

As all signals from the semiconductor packages 4 are collected on the signal busboard 10, control of individual semiconductor packages 4 can also be executed by means thereof. Accordingly, individual semiconductor packages 4 can also be switched-out or switched-in, as required.

The function of the signal busboard 10 is the collection, i.e. consolidation, of all signals from components of the single-phase module 1. From thence, control of the single-phase module 1 can then be executed, e.g. via an externally connected ECU (electronic control unit), which can also control a plurality of single-phase modules.

On the signal busboard 10, signals originating from the semiconductor packages 4 are synchronized, isolated (balanced) and consolidated into a single signal, which is then transmitted to the ECU. Accordingly, no further routing is executed on the ECU (the driver). Capacity can thus be saved on the ECU, notwithstanding the provision on each single-phase module 1 of a plurality of components, specifically for monitoring, signals from which can be transmitted to the ECU.

The size of the busboard 10 is selected such that it can be fastened to the domes 61, and all necessary signals can be routed thereto.

In one embodiment, the DC-positive conductor rail 5 comprises a cladding on regions at which it is not electrically contact-connected, as represented in FIGS. 19 to 22. In particular, the DC-positive tap 53 on the underside of the DC-positive conductor rail 5 has no cladding 50. However, cladding 50 is present on the upper side thereof. This is particularly important in an embodiment in which the DC-negative conductor rail 6 is arranged above the DC-positive conductor rail 5, and also extends over the DC-positive tap 53, as electrical insulation is required between the DC-negative conductor and the DC-positive conductor. Advantageously, the cladding with the exception of electrical contact-connection regions, is continuously configured about the DC-positive conductor rail 5, wherein the cladding 50, particularly on the underside of the DC-positive conductor rail 5, extends to the outer edge of the baseplate 2, or projects beyond the latter.

Cladding 50 can also be provided for the support of positioning, both for the DC-positive conductor rail 5 and for a component which is arranged above the latter, such as the DC-negative conductor rail 6. Cladding 50 is thus advantageously provided in the region between the electrical contacts (the DC-positive tap 53 and the HV-positive power terminal pin 51) on both sides of the DC-positive conductor rail 5, and is thus employed both as electrical insulation and as a positioner.

Figures 19, 20, 21:
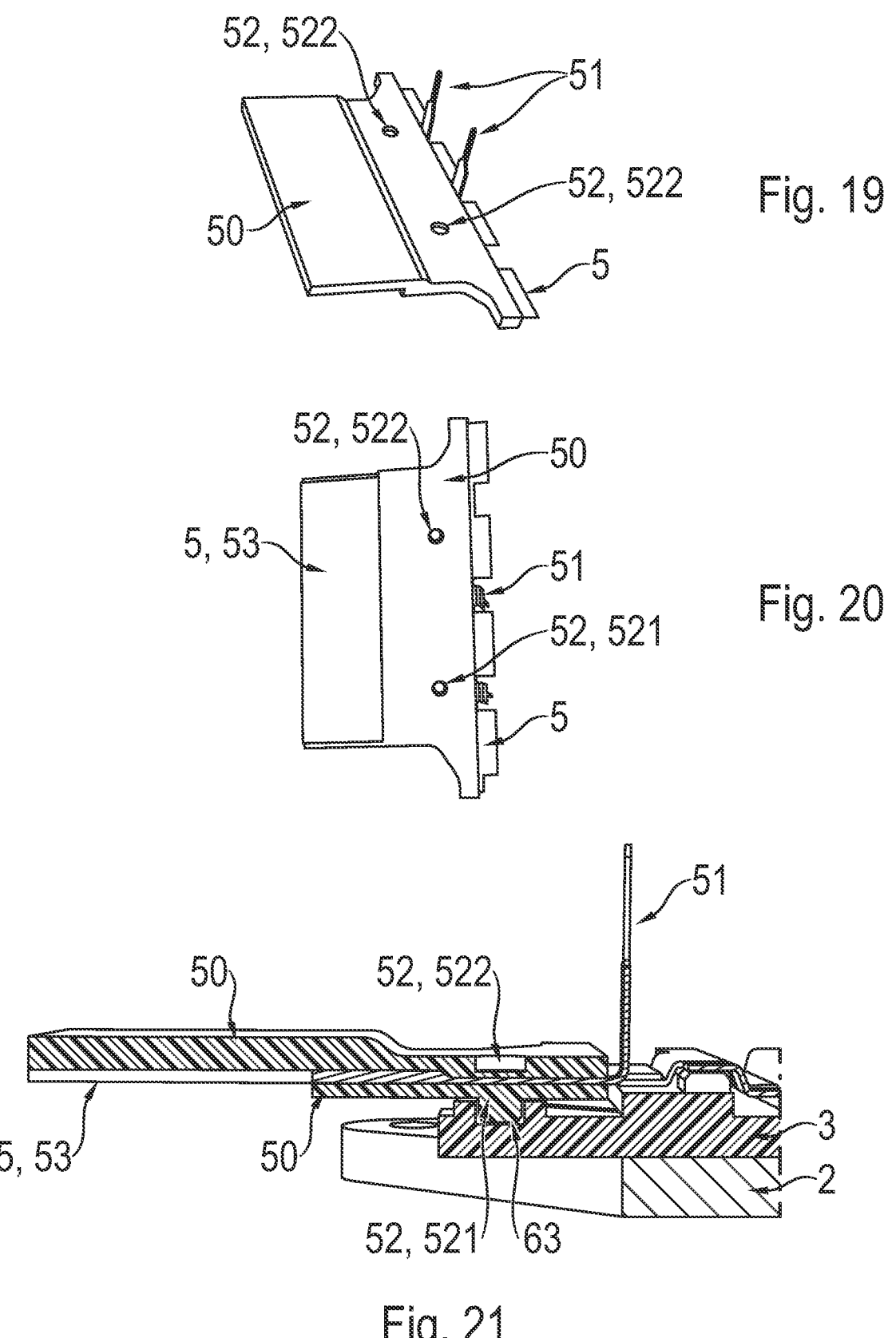
FIGS. 19, 20, 21, 22, and 23 show a sheathed conductor rail, and an insulating rail having fastening means, according to one embodiment of the present invention.
Figures 22, 23:
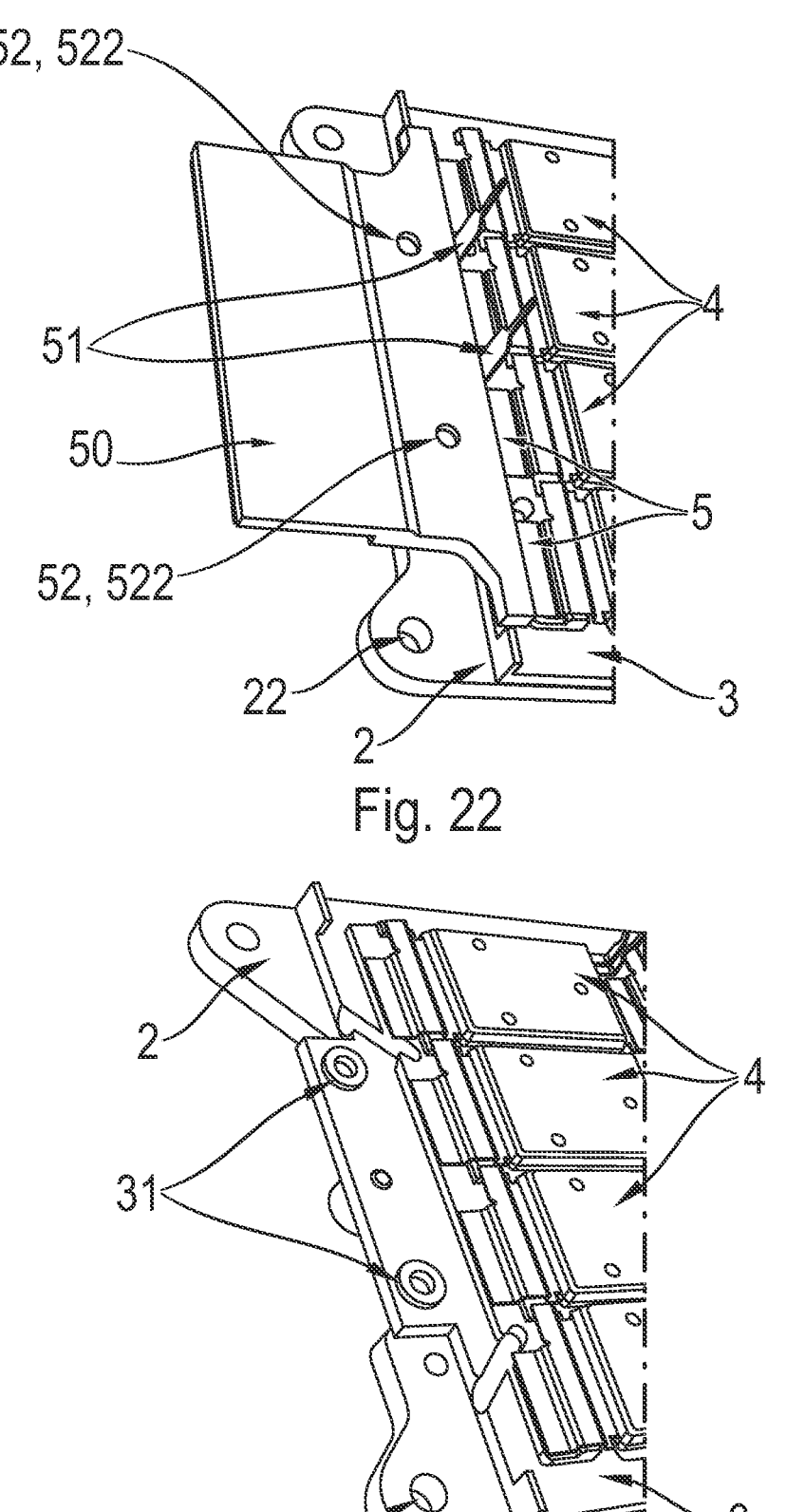

On the underside of the DC-positive conductor rail 5, as represented in FIGS. 20 and 21, a plug-in structure 52 is provided in the cladding 50 on the underside of the DC-positive conductor rail 5, which is configured here in the form of a projection/pin 521, and which can engage with an associated mating structure, which is represented e.g. in FIG. 23, in the form of a cut-out 31 in the insulating frame 3. On the upper side of the DC-positive conductor rail 5, as represented in FIGS. 19, 21 and 22, in a region in which the upwardly arranged DC-negative conductor rail 6 is positioned upon assembly, a plug-in structure 52 is provided (formed) in the cladding 50, which is configured here in the form of a cut-out 522, and which can engage with an associated projection 651, which is represented e.g. in FIG. 16, in the cladding 60 of the DC-negative conductor rail 6.

The cladding 50, as per the embodiment described with respect to the cladding 60 of the DC-negative conductor rail 6 is also formed here of an electrically insulating material, preferably a molding material, which is thus appropriate for encapsulation or overmolding (by a flow process).

By means of the cladding 50 and 60 of the DC conductor rails 5 and 6, electrical insulation is provided in a simple and effective manner. Moreover, the cladding 50 and 60 can simultaneously be employed as positioners for other components of the single-phase module 1.

Figure 24:
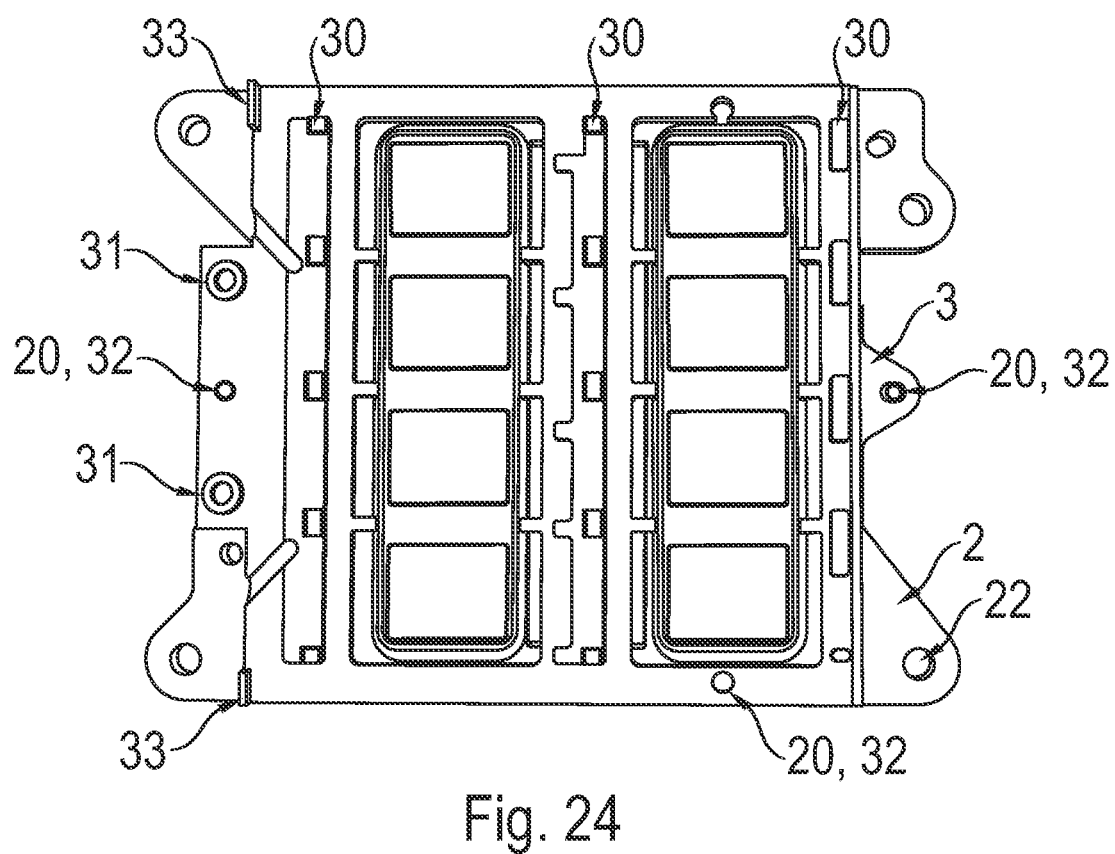
FIGS. 24, 25, 26, and 27 show a single-phase module having an insulating frame, according to one embodiment of the present invention.
Figure 25:
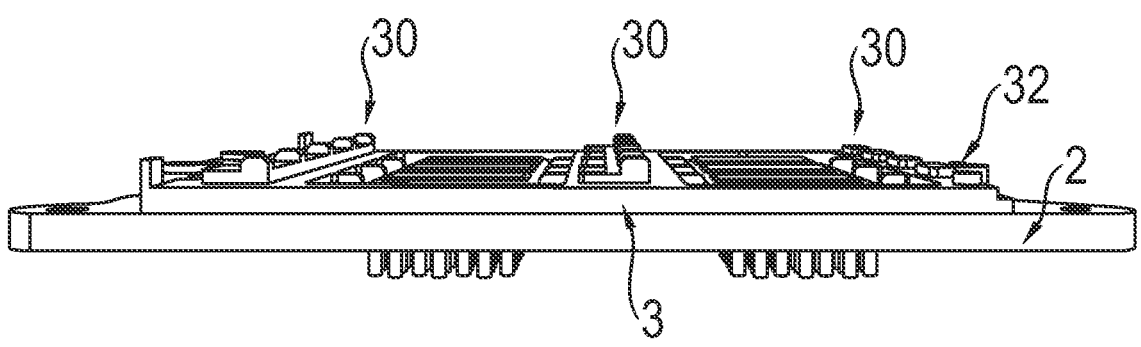

In all embodiments, an insulating frame 3 of an electrically insulating material can be provided on the baseplate 2, as represented in FIGS. 24 to 27. This is employed as a positioner and welding guide for a majority of the components of the single-phase module 1. It is formed of an electrically insulating material, and functions as a fastener and a positioner. The insulating frame 3 is configured such that it is directly arranged on (applied to) the baseplate 2, and covers the latter, at least in regions in which components which are to be arranged upon thereafter are fastened. It is only absent from those regions in which semiconductor packages 4 are fastened to the baseplate 2, and thus comprises corresponding cut-outs, as represented in FIGS. 24 and 25. It can also be seen here that the insulating frame 3 comprises various projections and recesses, or cut-outs/openings. These are employed as positioning structures 30-33.

Figure 27:
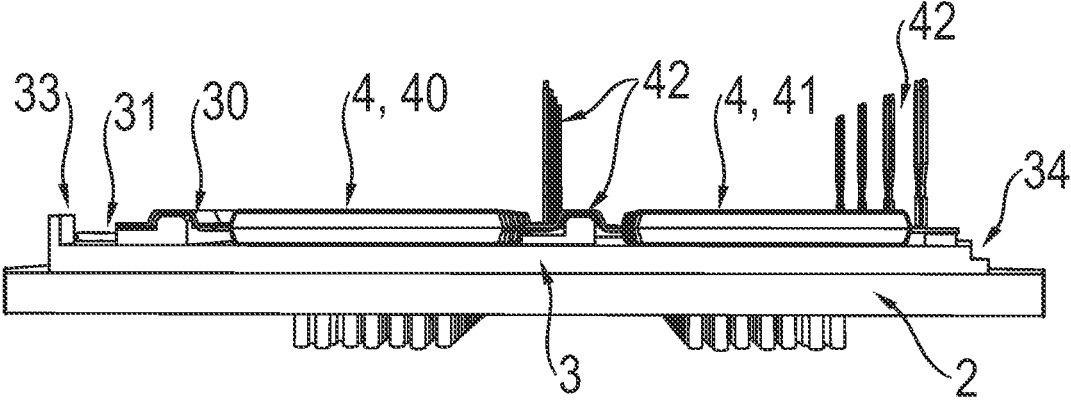

For example, the projection 30 is employed as a seating for pins of the semiconductor packages 4 such that the latter, upon fastening (by welding), are not subject to failure or strain, as can be clearly seen in FIG. 27. The two positioning structures 31 are employed, for example, as mating structures for the plug-in structure 52 of the DC-positive conductor rail 5, as described above and also represented in FIG. 23.

Figure 26:
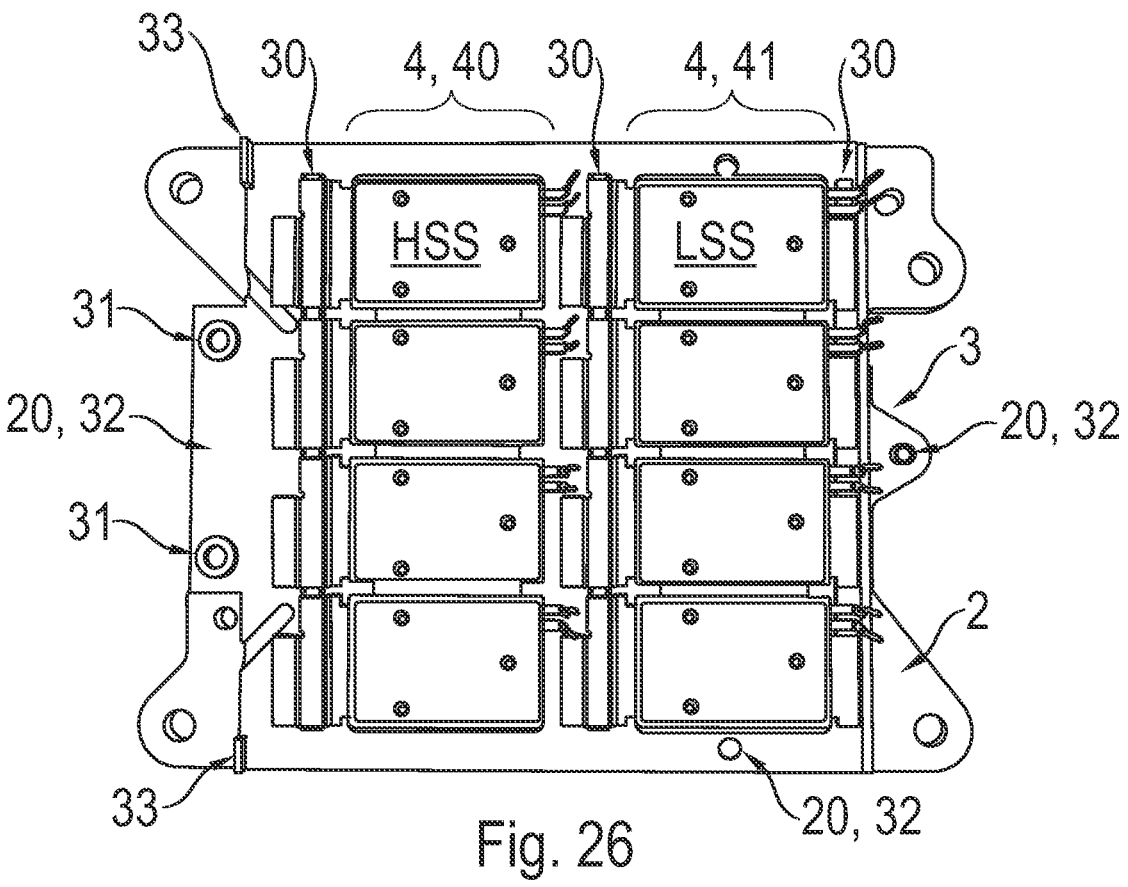

The positioning structures 20 (the pin projecting from the baseplate 2) and 32 (the opening 32 in the insulating frame 3) are employed for the positioning of the insulating frame 3 on the baseplate 2, as represented e.g. in FIGS. 24 and 26. Advantageously, two such positioning structures 20 and 32 are provided, which are arranged on mutually opposing sides of the baseplate 2, wherein there is no restriction as to the number of positioning structures 20 and 32.

Positioning structures 33, in turn, serve exemplary and unified positioning structures 63 on the underside of the DC-negative conductor rail 6, by way of the positioning structure represented in FIGS. 16, 24, 26. The positioning structures 33 can be configured in the form of ribs, with which a corresponding mating structure on the DC-negative conductor rail 6 engages, or as pins which are inserted in recesses.

The insulating frame 3 can moreover comprise a positioning structure 34 for the edge region 81 of the insulating insert 8, as represented e.g. in FIGS. 7, 33 and 34. This can be configured e.g. with a stepped arrangement, such that the edge region 81, upon the fitting of the insulating insert 8, is applied to the step platform (seating) and engages with the step (limit stop).

It is not necessary for each of the positioning structures 30-34 described to be present. Instead, in all cases, a positioning structure 30-34 is only provided where a corresponding mating structure is also present. The conductor rails 5, 6, at least in regions at which they are in contact with the positioning structure 30, 31, 33, 34, are enclosed by the above-mentioned electrically insulating cladding 50, 60, or by the insulating insert 8.

The insulating frame 3 is advantageously formed of a high-temperature-resistant material, with no associated outgassing during the assembly of the single-phase module 1, particularly in the event of sintering, i.e. where semiconductor packages 4 are fastened to the baseplate 2.

In one embodiment, a single-phase module 1 is configured with a plug-in system layout. In this embodiment, each component has positional geometries, as described above in conjunction with the individual components (the baseplate 2, the insulating frame 3, the conductor rails 5-7, the insulating insert 8 and the planar component 9) of the single-phase module 1. Components which are to be stacked on top of one another can thus be accurately positioned. Final attachment (fixing) is only executed by means of the (pen)ultimate component, the planar component 9 which functions as a hold-down device for the enclosure and consolidation of the entire component stack, as represented in the exploded view according to FIG. 43. On this (pen)ultimate component, the signal busboard 10 can then be fitted to four domes 61, which are provided on the outermost ends thereof and which function as seatings 611, and secured using the hold-down device 9, by means of fastenings such as e.g. screws 11 (and is also contact-connected to the ground potential GND).

Accordingly, during the assembly process, only a basic fixing is executed, by the welding of the individual conductor rails 5-7 immediately they are fitted. All other components are interconnected and mutually positioned by means of their positional geometries only (positioning structures, plug-in structures, etc.), as described above with reference to the individual components. Thus, upon the fastening of the planar component 9 which serves as a hold-down device, no screw fixing, adhesive bonding, etc. is required.

Essentially, the above-mentioned positioning structures for the individual components, i.e. the positioning structure 20 of the baseplate 2 and the positioning structures 30-34 of the insulating frame 3, together with the plug-in structures 52, 65 of the claddings 50, 60, the domes 61, the tunnels 612, the openings 611, 613-616, the positioning structure 63, the engagement region 64 and the edge region 81, the openings 82 for the domes 61 and the tunnels 83 for the pins 42, together with the openings 90 and cut-outs 91 in the planar component 9 can be employed as positioners, provided that the individual structures are mutually tailored, both geometrically and with respect to their arrangement, such that they constitute no mutual interference and, in each case, function as a structure and a mating structure, as described above with respect to the individual components.

Structures of optional components such as the insulating frame 3 can be replaced by structures of underlying or overlying components.

Specifically, the baseplate 2, as represented in FIG. 35, comprises a plurality of openings, which function as fixing holes 22 for the lugs 92 of the planar component 9, and to which it can be fastened. The baseplate 2 likewise comprises at least one, and preferably two or more positioning structures 20, which preferably assume the form of pins. These are employed to mate with the corresponding positioning structure 32 of the (optional) insulating frame 3, which is preferably configured as an opening via which the associated pin can be introduced into the baseplate 2, as represented in FIGS. 36 and 43. These two components are mutually positioned accordingly.

Immediately the insulating frame 3 is fitted to the baseplate 2, the semiconductor packages 4 are inserted in the cut-outs which are provided for this purpose in the insulating frame 3 and are directly connected to the baseplate 2, preferably by sintering thereto, as also represented in FIGS. 36 and 43. To this end, the insulating frame 3 comprises positioning structures 30 in the form of seatings/projections for the pins of the semiconductor packages 4, in order to function as a support for power terminal upon the assembly thereof by welding, such that the latter undergo no strain in conjunction with the connection process, as can be seen in detail in FIG. 27.

As also represented in FIG. 27, the insulating frame 3, on the side upon which the DC conductor rails 5 and 6 are arranged (left-hand side of FIG. 27), comprises a positioning structure 33 which mates with a positioning structure 63 of the DC-negative conductor rail 6 represented on the left-hand side of FIG. 16 (by mutual engagement), where the DC-negative conductor rail 6 is fitted to the insulating frame 3 and the DC-positive conductor rail 5. Moreover, the insulating frame 3, on the side upon which the AC conductor rail 7 is arranged (right-hand side of FIG. 27), comprises a further positioning structure 34, with which the edge region 81 of the insulating insert 8 represented in FIGS. 33 and 34 engages, or to which it is applied.

Figure 6:
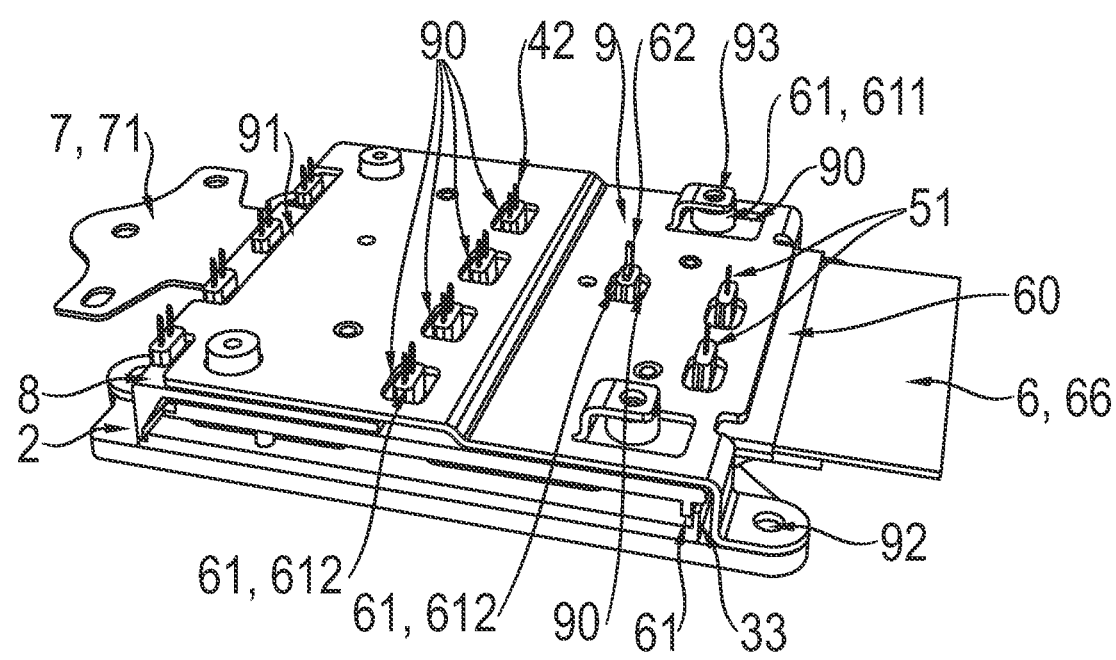
FIGS. 6, 7, and 8 show overhead views of the single-phase module (FIGS. 6 and 8) and a front view of the single-phase module (FIG. 7) according to FIG. 6, having a planar component arranged above the conductor rails, according to one embodiment of the present invention.

The insulating frame 3 moreover comprises a positioning structure 31 for positioning the plug-in structure 52 which is provided on the underside of the DC-positive conductor rail 5, as represented in FIGS. 20 and 36. This permits a simple positioning of the DC-positive conductor rail, including the HV-positive power terminal pin 51. The positioning structure 31 and the plug-in structure 52 are configured e.g. as two mutually spaced and mutually complementary structures, e.g. a pin and a cut-out for the accommodation of the pin. Particularly advantageously, the region of the DC-positive conductor rail 5 which comprises the positioning structures 52 is provided with a cladding 50. In FIGS. 19, 21, 22 and 37, the cladding 50 is further provided on the upper side of the DC-positive tap 53 on the grounds that, in a next step, the DC-negative conductor rail 6 is led over the DC-positive tap 53 in a full-surface arrangement, as represented in FIGS. 6, 7 and 38.

On the upper side of the DC-positive conductor rail 5, a further plug-in structure 52, 522 is provided (preferably directly opposite the plug-in structure 52 on the underside), which is employed as a positioner for the DC-negative conductor rail 6, as represented e.g. in FIGS. 19 and 22. As shown in FIG. 38, the DC-negative conductor rail 6 is fitted to the DC-positive conductor rail 5. To this end, the DC-negative conductor rail 6 comprises a plug-in structure 65 which is complementary to the plug-in structure 52. The plug-in structures 52 and 65 are thus configured e.g. as two mutually spaced and mutually complementary structures, e.g. a pin 652 and a cut-out 522 for the accommodation of the pin.

Advantageously, at least the region of the DC-negative conductor rail 6 which is led over the DC-positive conductor rail 5 is provided with a cladding 60, as described above. It is particularly preferred that the DC-negative conductor rail 6 is led over the semiconductor packages 4 in a full-surface arrangement and is provided with a cladding 60, such that the AC conductor rail 7 can be arranged thereupon, as represented e.g. in FIG. 39.

The DC-negative conductor rail 6 further comprises, at the underside thereof facing the DC-positive conductor rail 5, further positioning structures 63, as represented e.g. in FIG. 16. These are preferably provided at outer end or corner regions (externally to the region in which the DC-positive conductor rail 5 is arranged) and function as positioners for the DC-negative conductor rail 6 on the baseplate 2 above the insulating frame 3, as described above and represented e.g. in FIG. 18.

The cladding 60 of the DC-negative conductor rail 6 further comprises on its upper side, as described above, domes 61 which function as tunnels 612 and seatings 611, which are also employed as positioners. The upper side of the cladding of the DC-negative conductor rail 6 further comprises engagement regions 64 for the AC conductor rail 7, as described with reference to FIG. 17. It also comprises one or more openings 614 into which the AC power terminal 70 can be introduced and connected to the AC power terminal of the semiconductor packages 4. Accordingly, these openings 614 also function as positioners.

The insulating insert 8 is then fitted above the AC conductor rail 7, as can be seen e.g. in FIG. 40, and as described in conjunction with FIGS. 30 to 34. As can be seen e.g. in FIG. 43, the insulating insert 8 comprises openings 82 in order to permit, by means of the domes 61 in the cladding 60, the fitting of the DC-negative conductor rail 6 to the AC conductor rail 7. It further comprises domes configured in the form of tunnels 83, in order to permit the electrically insulated lead-out of power and/or signal pins 42 of the semiconductor packages 4 to the upper side thereof.

All the above-mentioned and mutually stacked components 2-8 are neither screwed nor adhesively bonded etc. for the purposes of fixing. They are mutually positioned and oriented by means of their geometry alone. The only connection is electrical connection, which is executed by the welding (or another means of connection) of the (electrically contact-connectable and unclad regions of the) conductor rails 5-7 to the associated terminals of the semiconductor packages 4. In order to secure the above-mentioned stack of components 2-8, the planar component 9 described above with reference to FIGS. 5, 14, 15 and 18 is fitted to the stack 2-8 and, by means of lugs 92 thereof is connected to corresponding fixing holes 22 in the baseplate 2, e.g. by screw fixing. The planar component 9 thus functions as a hold-down device and attachment for all the components in the stack, as represented e.g. in FIGS. 41 and 43. As a final component, the signal busboard 10 can now be fitted to the hold-down device 9, by the connection thereof to the domes 61 (respectively arranged at the corner regions) e.g. by screw fixing.

By means of the positional geometries proposed, which function as aids for assembly, a modular plug-in system is provided in which all components can be optimally and accurately positioned, without the necessity for separate mechanical connecting elements or connection methods.

The proposed single-phase module 1 is an element of an inverter, i.e. of a DC/AC power converter, which preferably comprises three phases P1-P3, from each of which a single-phase module 1 is formed. The inverter is advantageously employed in power electronics for the operation of a three-phase electric motor of a vehicle, and is connected, with signal transmission capability, to an electronic control unit, or ECU for short, which functions as a driver. The function of the ECU is the actuation and control of the electric motor.

The single-phase module 1 can moreover comprise an unrepresented cooling apparatus, e.g. in the form of vanes or fins, or can be connected to a separate cooling apparatus at the underside of the baseplate 2 (the opposing side to the side with the half-bridges).

Power electronics are preferably employed in an electric drive system of a vehicle which comprises a three-phase AC electric motor and an accumulator, wherein the power electronics are connected to both, such that the inverter generates, from the direct current supplied by the accumulator, an alternating current which is employable by the electric motor, thus permitting the propulsion of the electric motor. The electric motor is particularly configured as an electric axle drive. Advantageously, a vehicle, e.g. a passenger car or a utility vehicle, comprises at least one such drive.

LIST OF REFERENCE SYMBOLS

1 Single-phase module
2 Baseplate
20 Positioning structure
22 Fixing holes for lugs 92
3 Insulating frame
30 Positioning structure in the form of seatings/projections for pins
31 Positioning structure for DC-positive potential, cut-out
32 Positioning structure for baseplate, opening
33 Positioning structure for dome 61
34 Positioning structure (limit stop and seating) for edge region 81
4 Semiconductor packages
40 High-side power semiconductor
41 Low-side power semiconductor
42 Power/signal pins of 4 (G/S/D/Kelvin-Source)
5, 6, 7 Conductor rails (DC+; DC−, AC)
50 Cladding of DC-positive conductor rail
51 HV-positive power terminal pin
52 Plug-in structure in cladding
521 Projection/pin
522 Cut-out
53 DC-positive tap
60 Cladding of DC-negative conductor rail
61 Domes
612 Tunnels for pins
611 Seatings and fastening element for GND/fastening
613 Opening for temperature sensor
614 Opening for AC power terminal
615 Opening for power and/or signal pins 42
616 Opening for HV-positive power terminal pins 51
62 HV-negative power terminal pin
63 Positioning structure
64 Engagement region for AC conductor rail
65 Plug-in structure in cladding
651 Projection/pin
66 DC-negative tap

67 Openings in 6 for 42, 70, 51, 106
70 AC power terminal
71 AC tap
72 Opening for 106
8 Insulating insert on AC and between AC and hold-down device
81 Edge region, engaging with positional geometry of 3
82 Openings for domes 61
83 Tunnels for pins
84 Openings for 106
9 Planar component, configured as hold-down device, and EMC shield
90 Openings
91 Cut-outs
92 Lugs, baseplate fastening
93 Fastening to dome of 62
10 Signal busboard
101 Pin openings for High-/Low-side Gate/Kelvin Source
102 Opening for HV power terminal pin 51 or 62
103 HV-positive CY capacitor
104 HV-negative CY capacitor
105 Desaturation pin
106 Temperature sensor
107 Opening for GND
108 Test points
11 Fasteners (screws)
ECU ECU
GND Ground potential or ground contact-connection
P1, P2, P3 Phases

The invention claimed is:

1. A single-phase module of an inverter of an electric drive system of an at least partially electrically powered vehicle, comprising:

a baseplate;

at least two semiconductor packages comprising half-bridges which are arranged on the baseplate and directly fastened thereto; and conductor rails configured in a conductor rail stack arrangement on the half-bridges and electrically contact-connected with associated power terminals, comprising a DC-positive conductor rail, a DC-negative conductor rail, and an AC conductor rail, wherein the conductor rails, at least in regions at which they are electrically insulated from other components, are enclosed in an electrically non-conductive cladding, wherein components are configured such that each of the components, in regions at which, upon assembly, they are positioned in relation to other components, comprise at least one positioning geometry for positioning that engages with a corresponding mating structure provided in the other components, wherein the DC-positive conductor rail is arranged on the baseplate or on an insulating frame, followed by the DC-negative conductor rail arranged above at least a portion of the DC-positive conductor rail, wherein the DC-negative conductor rail is configured in a full-surface contact arrangement over the half-bridges such that it covers an entirety of the half-bridges and which, at least in regions in which the half-bridges are located, is entirely enclosed in an electrically insulating cladding, wherein, in regions of the cladding at which further components of the single-phase module are to be positioned upon assembly, positioning structures are provided, which are formed of the cladding, and wherein the AC conductor rail is arranged above the DC-negative conductor rail such that it covers at least a portion of the DC-negative conductor rail.

2. The single-phase module according to claim 1, wherein:

the insulating frame is made from an electrically insulating material and is arranged between the baseplate and an underside of the conductor rail stack, and comprises openings in region of the half-bridges, and is configured such that it comprises at least one positioning structure by way of a positioning geometry, wherein at least one of:

a first positioning structure is configured to position components of the single-phase module which are arranged thereupon, at least one further positioning structure is configured to position a positioning structure of the baseplate, at least one second positioning structure is employed in a region of power terminals of the at least two semiconductor packages as a seating and support for power terminals of the at least two semiconductor packages, a third positioning structure is employed in outer regions thereof as a limit stop and/or seating for an insulating insert of a third conductor rail which is arranged thereupon, and/or at least a fourth positioning structure on outer regions of the insulating frame configured to position at least one of the conductor rails which is arranged thereupon.

3. The single-phase module according to claim 1, wherein the cladding of the DC-negative conductor rail, in predefined regions, is configured such that, on an upper side thereof which is averted from the baseplate and in regions at which power and/or signal pins are arranged which are to be led through the DC-negative conductor rail from below, comprises projecting domes configured such that:

tunnels are formed for a lead-through of power and/or signal pins of the at least two semiconductor packages and the DC-positive conductor rail, and at least one power and/or signal pin of the DC-negative conductor rail is enclosed thereby, and/or wherein at least part of the domes are configured as seatings and/or as fastening elements.

4. The single-phase module according to claim 1, comprising:

an insulating insert of an electrically insulating material which is fitted to the AC conductor rail and is configured to electrically insulate the AC conductor rail vis-à-vis an exterior of the single-phase module, wherein the insulating insert at its outer edge region comprises a bevel in a direction of the DC-negative conductor rail that at least extends downwards to cover outer regions of the DC-negative conductor rail.

5. The single-phase module according to claim 4, wherein the insulating insert comprises at least one of:

at least one opening, which is configured and arranged for respective feedthrough of at least one dome of the DC-negative conductor rail;

at least one projecting dome, which is configured in the form of a tunnel for lead-through of power and/or signal pins of the at least two semiconductor packages, and/or at least one opening to accommodate a temperature sensor.

6. The single-phase module according to claim 1, comprising:

a planar component which is configured in a full-surface arrangement over the conductor rail stack, and is configured as a hold-down device which comprises a plurality of lugs which extend beyond outer end regions of the conductor rail stack to the baseplate and are fastened thereto such that components of the single-phase module which are arranged below the planar component are secured.

7. The single-phase module according to claim 1, comprising:

a planar component which is configured in a full-surface arrangement over the conductor rail stack, and is configured as a hold-down device which comprises openings and/or cut-outs for feedthrough of domes from components of the single-phase module which are arranged below the planar component to the upper side thereof.

8. Power electronics for operating a three-phase electric motor of a vehicle, wherein the power electronics comprise:

an inverter that, for each phase, is configured in the form of the single-phase module according to claim 1; and at least one ECU that is connected to the electric motor for regulation and control thereof, and is connected to the inverter.

9. An electric drive system of a vehicle, comprising:

a three-phase electric motor;

an accumulator; and the power electronics according to claim 8, wherein the power electronics are connected to the three-phase electric motor and the accumulator.

10. A vehicle comprising the electric drive system according to claim 9, wherein the electric drive system is configured in the form of an electric axle drive.

11. A single-phase module of an inverter of an electric drive system of an at least partially electrically powered vehicle, comprising:

a baseplate;

at least two semiconductor packages comprising half-bridges which are arranged on the baseplate and directly fastened thereto; and conductor rails configured in a conductor rail stack arrangement on the half-bridges and electrically contact-connected with associated power terminals, comprising a DC-positive conductor rail, a DC-negative conductor rail, and an AC conductor rail, wherein the conductor rails, at least in regions at which they are electrically insulated from other components, are enclosed in an electrically non-conductive cladding, wherein components are configured such that each of the components, in regions at which, upon assembly, they are positioned in relation to other components, comprise at least one positioning geometry for positioning that engages with a corresponding mating structure provided in the other components, wherein the DC-positive conductor rail is arranged on the baseplate or on an insulating frame, followed by the DC-negative conductor rail which is configured in a full-surface contact arrangement over the half-bridges and which, at least in regions in which the half-bridges are located, is entirely enclosed in an electrically insulating cladding, wherein, in regions of the cladding at which further components of the single-phase module are to be positioned upon assembly, positioning structures are provided, which are formed of the cladding, wherein the AC conductor rail is arranged above the DC-negative conductor rail, wherein the single-phase module further comprises:

an insulating insert of an electrically insulating material which is fitted to the AC conductor rail and is configured to electrically insulate the AC conductor rail vis-a-vis an exterior of the single-phase module, wherein the insulating insert at its outer edge region comprises a bevel in a direction of the DC-negative conductor rail that at least extends downwards to cover outer regions of the DC-negative conductor rail, and wherein the insulating insert comprises at least one of:

at least one opening, which is configured and arranged for respective feedthrough of at least one dome of the DC-negative conductor rail;

at least one projecting dome, which is configured in the form of a tunnel for lead-through of power and/or signal pins of the at least two semiconductor packages; and/or at least one opening to accommodate a temperature sensor.

* * * * *